US010628805B2

(12) United States Patent
Rodatos

(10) Patent No.: US 10,628,805 B2
(45) Date of Patent: Apr. 21, 2020

(54) CALCULATING AND REDUCING CARBON FOOTPRINT IN A WASTE MANAGEMENT PLAN

(75) Inventor: Constantine D. Rodatos, South San Francisco, CA (US)

(73) Assignee: Green Halo Systems, Inc., San Jose, CA (US)

( * ) Notice: Subject to any disclaimer, the term of this patent is extended or adjusted under 35 U.S.C. 154(b) by 240 days.

(21) Appl. No.: 13/206,503

(22) Filed: Aug. 9, 2011

(65) Prior Publication Data
US 2013/0041832 A1 Feb. 14, 2013

Related U.S. Application Data

(63) Continuation-in-part of application No. 13/205,610, filed on Aug. 8, 2011, now abandoned.

(60) Provisional application No. 61/401,021, filed on Aug. 6, 2010.

(51) Int. Cl.
G06Q 50/18 (2012.01)
G06Q 10/00 (2012.01)
G06Q 10/10 (2012.01)

(52) U.S. Cl.
CPC .......... G06Q 10/30 (2013.01); G06Q 10/10 (2013.01); G06Q 50/18 (2013.01); Y02P 90/84 (2015.11)

(58) Field of Classification Search
CPC .................................... G06Q 10/30
USPC ........................................ 705/1.1
See application file for complete search history.

(56) References Cited

U.S. PATENT DOCUMENTS

| 5,852,560 | A | * | 12/1998 | Takeyama et al. | 700/97 |
| 6,122,622 | A | | 9/2000 | Wiitala et al. | |
| 7,813,827 | B2 | | 10/2010 | Key | |
| 2002/0072923 | A1 | | 6/2002 | Guidry | |
| 2002/0147502 | A1 | * | 10/2002 | Price | G06Q 10/06 700/1 |
| 2002/0156545 | A1 | * | 10/2002 | Sekino | B09B 5/00 700/90 |
| 2003/0131011 | A1 | * | 7/2003 | Haunschild | G06Q 10/10 |
| 2003/0210127 | A1 | * | 11/2003 | Anderson | G06F 21/36 340/5.27 |

(Continued)

OTHER PUBLICATIONS

Stoxen, Alexis, "Goodbye Carbon Copy Weight Tickets, Hello WasteCap TRACE", published Jan. 7, 2009, available at http://www.wastecap.org/wp/wp-content/uploads/file/WasteCap TRACE%20News%20Release.pdf, retrieved on Nov. 1, 2013; WasteCapTRACE Screen Shots of the WasteCapTRACE software, available Jan. 31, 2010, total pp. 14.*

(Continued)

Primary Examiner — Jan P Mincarelli
(74) Attorney, Agent, or Firm — Aka Chan LLP

(57) ABSTRACT

An on-line waste management reporting and tracking system allows contractors to create waste management plans. Cities and other governing bodies can manage and enforce their recycling policies. Property owners can track the recycling on construction debris within their property. Recycling facilities can create diversion reports and upload tickets directly to a project. Users communicate and interact via the system. Waste management plans can be submitted directly to the governmental bodies. Users track recycling on construction projects through detailed recycling reports. The system calculates a plan's emissions and gives suggestions on how to reduce a plan's carbon footprint.

26 Claims, 29 Drawing Sheets

Diagram for Haulers

(56) References Cited

U.S. PATENT DOCUMENTS

| | | | |
|---|---|---|---|
| 2004/0039587 A1* | 2/2004 | Horoshige | B09B 5/00 705/308 |
| 2005/0010465 A1 | 1/2005 | Drew et al. | |
| 2005/0102173 A1* | 5/2005 | Barker | G06Q 10/063 705/7.26 |
| 2006/0190391 A1* | 8/2006 | Cullen, III | G06Q 10/10 705/37 |
| 2007/0278140 A1* | 12/2007 | Mallett | B07C 7/005 705/308 |
| 2008/0059970 A1* | 3/2008 | Gonen | G06Q 10/06 718/104 |
| 2008/0228629 A1 | 9/2008 | Gotthelf et al. | |
| 2009/0099954 A1* | 4/2009 | Kilby | G06Q 10/06 705/37 |
| 2010/0030608 A1* | 2/2010 | Kaminsky | G06Q 10/08345 705/335 |

OTHER PUBLICATIONS

WasteCap collectively comprises: Stoxen, Alexis, WasteCap Resource Solutions Press Release, "Goodbye Carbon Copy Weight Tickets, Hello WasteCapTRACE," published Jan. 7, 2009, available at http://www.wastecap.org/wp/wp-content/uploads/file/WasteCapTRACE%News%20Release.pdf, retrieved on Nov. 1, 2013; WasteCapTRACE Screen Shots of the WasteCapTRACE software, avialable Jan. 31, 2010; WastCapTRACE, "Fast, Simple, All in one place," available online Jan. 13, 2010, retrieved from http://www.wastecaptrace.org/Account/Whysubscribe.aspx on.

CalRecycle collectively comprises: CalRecycle, "Jurisdictions With Construction & Demolition (C&D) Ordinances," available Sep. 29, 2006, retrieved from http://www.calrecyle.ca.gov/dondemo/Ordinances/Jurisdictions/SanMateo.htm on Nov. 1, 2013; CalRecycle, "Facility/Site Search," available online Jan. 7, 2010, retrieved from http://www.calrecycle.ca.gov/SWFacilities/Directory/search.aspx on Nov. 1, 2013.

GreenBuilding, "Cities and Public Agencies in Alameda County with Construction and Demolition Ordinances," available online Jan. 8, 2010, retrieved from www.stopwaste.org/docs/ordinance_matrix_gb.pdf on Nov. 3, 2013.

COJ.net collectively comprises: City of Jacksonville, FL, "Useful Links," available Mar. 4, 2009, retrieved from http://www.coj,net/departments/public-works/solid-waste/useful-links.aspx on Nov. 4, 2013; Screen shot from "Earth911.com" recycling search page, available online May 29, 2010, retrieved from earth911.com on Nov. 5, 2013.

Schertz, A., "Innovations: New Online Tool Helps Contractors Reduce Project Waste," BizTimes.com, Feb. 5, 2010.

Screenshots of WasteCap TRACE software program, Jan. 31, 2010.

"Construction Waste Recycling to be Pushed in City," BuffaloRising.com, Nov. 14, 2009, 42 pages.

U.S. Appl. No. 13/205,610, filed Aug. 8, 2011, available via IFW (see file history incl. office action with notification date of Nov. 29, 2013).

* cited by examiner

Green Halo Web Based Software Top Level Structure

Green Halo Communication Flow Chart

Contractor High Level Functions and Interactions

Contractor Recycler Search Functions

Create Waste Management Plan and Submit to City Online

Diagram for Haulers

Recycling Facility Search

City Top Level Functions

City Waste Management System

County Top Level Functions

Recycling Facility

How Corporate Office Will Add a Building

Green Halo Pricing Model

| No. | Project | Start | End | Duration | Jan | Feb | Mar | Apr | May | Jun | Jul | Aug | Sept | Oct | Nov | Dec |
|---|---|---|---|---|---|---|---|---|---|---|---|---|---|---|---|---|
| 1 | Smith – 555 Broadway Street – SF | 1/11/09 | 5/15/09 | 89 | A B | B | B | B | B C | C | C | C | C | C | C | C |
| 2 | Yamato – 88 Fallen Leaf – Walnut Creek | 3/3/09 | 8/25/09 | 124 | | | A B | B | B | B | B | B | | | | |
| 3 | Rossi – 47 University – Palo Alto | 4/5/09 | 11/27/09 | 169 | | | | A B | B | B | B | B | B | B | B | |
| 4 | Filbert Elementary School Remodel - 32456 Winchester Blvd – San Jose | 4/8/09 | 12/23/09 | 185 | | | | A B | B | B | B | B | B | B | B | B |
| 5 | Quizno's – Jack London Square – Oakland | 5/7/09 | 10/29/09 | 125 | | | | | A B | B | B | B | B | B | | |
| 6 | Jones – New Home Project – 177 Oakridge Blvd, Fremont CA | 7/9/09 | 1/1/10 | 125 | | | | | | | A B | B | B | B | B | B |

Legend:
A = $20 Set Up Fee Per Plan
B = $20 Monthly Fee Per Active Plan
C = $9.95 Monthly Membership Fee

Figure 29

Recycler Sign Up Process

CALCULATING AND REDUCING CARBON FOOTPRINT IN A WASTE MANAGEMENT PLAN

CROSS-REFERENCE TO RELATED APPLICATIONS

This patent application is a continuation-in-part of U.S. patent application Ser. No. 13/205,610, filed Aug. 8, 2011, which claims the benefit of U.S. provisional patent application 61/401,021, filed Aug. 6, 2010, which is incorporated by reference along with all other references cited in this application.

BACKGROUND OF THE INVENTION

This invention relates to the recycling of construction waste materials and, more particularly, to a computer system by which the parties involved in such waste material recycling can submit and receive required recycling plans, track and document their activities, and create and submit any necessary reports, among other operations in an integrated fashion.

There is an increasing demand for waste management and reuse of materials by contractors as well as other related businesses entities due to the growing demand for green building and the overall green movement. Increasingly, new ordinances are being established by state and local governments which include banning construction and debris material waste from landfills. This movement by the state and local governments, along with their efforts to increase diversion and recycling rates, has placed more pressure on contractors and other business entities to adopt sustainable construction waste management practices.

A practice in the construction industry has been the simple dumping of material removed from a building site in dumps and landfill. Especially at sites with preexisting structures, there are materials which might be reused, removed, diverted, and recycled, rather being simply disposed. However, many disposal or dump sites are nearing capacity, and today environmental considerations have come into play. Government bodies have begun to issue regulations with recycling programs so that construction materials cannot be simply removed and dumped. A certain portion of construction waste must be diverted from simple disposal, i.e., a portion of the waste might be required to be reused or recycled. Only if reuse or recycling is not feasible, then the waste can be disposed of.

With the adoption of regulations and waste diversion programs, the resulting waste diversion efforts must typically be monitored and documented. Of course, these requirements impose burdens for everyone involved. For the government bodies, regulations must be issued and published, the necessary permits for waste diversion projects must be reviewed for approval, the waste diversion operations must be monitored to ensure compliance, and data and statistics must be gathered and reports in support of recycling program.

For the contractors, the forms for a waste diversion project for a particular jurisdiction must be properly completed out and filed, the required approvals for the project must be obtained, the compliance to regulations must be monitored during the project, including the creation of project records, the maintenance of these compliance records, and so on.

For the recycling facilities which receive the waste diversion materials, government approval to secure waste diversion business must be sought, the existence of waste diversion facilities must be available to the contractors, and the waste diversion operations at the facilities must be monitored and documented. For the managers and owners of the properties under construction projects, it would be desirable that status of the projects from planning, through construction to completion, be available.

From amount of effort and documentation described, it is readily evident that there is a need to manage waste diversion activities and operations in an integrated manner. In order to establish the new standards and guidelines for contractors, recyclers, other business entities and government agencies a widely recognizable reporting system is needed. Communications between the involved parties are coordinated and the various waste diversion operations are tracked, recorded and the necessary documentation maintained. Resulting data from the operations are also recorded for the easy generation of reports to the necessary parties. The present invention provides for such a solution.

BRIEF SUMMARY OF THE INVENTION

An on-line waste management reporting and tracking system allows contractors to create waste management plans. Cities and other governing bodies can manage and enforce their recycling policies. Property owners can track the recycling on construction debris within their property. Recycling facilities can create diversion reports and upload tickets directly to a project. Users communicate and interact via the system. Waste management plans can be submitted directly to the governmental bodies. Users track recycling on construction projects through detailed recycling reports. The system calculates a plan's emissions and gives suggestions on how to reduce a plan's carbon footprint.

The on-line system eliminates the need for paper. An implementation of the system is Web-based and provides a very efficient and effective tool for reporting, tracking, and communicating between contractors, recyclers, other business entities, and government agencies. A specific implementation is the Green Halo Systems Web site, accessible via a uniform resource locator (URL) at www.greenhalosystems.com. The entire Green Halo Web site, screens, documents, users' guides, and other documentation existing on the filing date of this patent application are incorporated by reference.

Contractor users can create and submit waste management plans directly to cities. Contractors can track recycling on construction projects and create detailed recycling reports for projects and the company. Governmental users can create, manage, and enforce waste ordinance policies simply and effectively. These users can easily edit terms and conditions, create custom recycling facility lists, view recycling statistics on construction projects, and enforce policies. Property owner users to easily manage, track, and monitor construction and demolition recycling activities. These users can see individual property and portfolio diversion rates and make sure contractors comply with local municipal and company waste recycling policies. Recycler users can list their sites on the system, making it easy for contractors doing business in your area to appropriate recycler sites.

The functions of the system interact with Salesforce.com. Schedules interact with mobile devices (e.g., smartphones and tablets) and Microsoft Outlook (and other e-mail clients). Routing interacts with Google Maps or other on-line mapping products. The functions interact with mobile devices (e.g., iPhone and Android devices). The displays are fully sortable and searchable. The plans and statistics can be exported, such as using a CSV or other format. The plans and statistics can be printed or exported into an Adobe Acrobat PDF format (or other portable print format), or both.

This invention pertains to green technologies including greenhouse gas reduction. This invention will improve environmental quality, energy conservation, development of renewable energy resources or greenhouse gas emission reduction.

In an implementation, a method of managing and coordinating the operations for waste diversion projects, the method includes: receiving information through a graphical user interface of a Web site for a waste diversion project; registering, by one or more computers operating the Web site, the waste diversion project for a particular jurisdiction and for a user of the Web site with the received information; presenting, by the one or more computers, waste diversion project requirements for the particular jurisdiction to the user; recording, by the one or more computers, an acceptance of the particular jurisdiction requirements by the user; assigning, by the one or more computers, a unique project-identification number to the waste diversion project; and tracking, by the one or more computers, a plurality of waste diversion process streams of materials from the waste diversion project.

The tracking of the waste diversion process streams step further includes: generating a receipt for a load of waste material at a waste diversion facility, wherein the receipt includes information related to how waste material in the load of waste material is to be diverted; assigning a unique receipt number for the load of waste material; receiving, through a terminal device, at least the receipt number; associating the unique project-identifying number with the unique receipt number in a database; and automatically updating one or more waste diversion statistics related to the information on the uniquely identified receipt in a database.

The load of waste material is composed of material selected from a list including: metals, wood, plastics, hazardous waste, fixtures, specialty materials, rock, dirt, plant material, and glass, and any one or combination of these.

The waste diversion statistics are selected from the list including: percentage of material in the load of waste material that is associated with a given waste diversion project, percent of waste material that is recycled, percent of waste material that is salvaged, percent of waste material that is converted to fuel, percent of waste material that is converted to energy, percent of waste material that is converted into raw materials, percent of waste material that is donated to charity, and percent of waste material that is thrown away, and any one or combination of these.

The method can further include: presenting a list of waste processing facilities to the customer, based on the customer's locality, specific waste diversion project needs, and customer preferences; and receiving the input of the customer as to that customer's preferred waste processing facilities.

The waste processing facilities are selected from a list including: a recycling plant, a hazardous waste processing plant, a power producing plant, a fuel producing plant, a charity, a roll off service, and a landfill, and any one or combination of these.

The terminal is selected from a list including a personal computer, a smartphone, a personal digital assistant (PDA) device, a dumb terminal, and a mobile telephone, or any one or a combination of these.

The jurisdiction is selected from a list including a city, a town, a county, a state, a prefecture, province, federal government, and a national government, or any one or a combination of these.

The waste diversion project is selected from a list including: a new construction project, a remodeling project, a recycling program, a deconstruction project, a salvage operation, and a clean-up operation, or any one or a combination of these.

The user is selected from a list including a general contractor, a subcontractor, a homeowner, a business, an educational facility, a recycler, a military facility, a public watchdog agency, a charity, and a government facility, or any one or a combination of these.

In an implementation, a method for tracking waste material produced during a waste diversion project includes: entering a receipt for waste material delivered to a waste processing facility; associating the receipt for waste material with a unique project-identifying number; detecting, at a remote database, whether the receipt for waste material has been previously entered; and if the receipt for waste material has been previously entered, then rejecting the receipt.

In an implementation, a computer program product, including a computer usable medium having a computer-readable program code embodied therein, said computer readable program code adapted to be executed to implement a method for communicating between entities in the waste disposal industry, the method including: computer-readable program code to facilitate registration, by means of a graphical user interface, of a waste diversion project by a customer in a particular jurisdiction; computer-readable program code for supplying a computer-based presentation of jurisdiction-specific requirements for that particular Jurisdiction to the customer; computer-readable program code for recording of the customer's acceptance of the requirements for the particular jurisdiction; computer-readable program code for assigning a unique project-identifying number to the waste diversion project; and computer-readable program code for centralized tracking of a plurality of waste diversion streams for the waste diversion project.

In an implementation, a method of managing and coordinating the operations for waste diversion projects includes: receiving information through a graphical user interface of a Web site for a waste diversion project; registering, by one or more computers operating the Web site, the waste diversion project for a particular jurisdiction and for a user of the Web site with the received information; presenting, by the one or more computers, waste diversion project requirements for the particular jurisdiction to the user; recording, by the one or more computers, an acceptance of the particular jurisdiction requirements by the user; assigning, by the one or more computers, a unique project-identification number to the waste diversion project; presenting, by the one or more computers, a list of waste processing facilities to the user based on a site location of the waste diversion project and a waste material to be disposed of, wherein presenting the list of waste processing facilities includes: (a) for each waste processing facility, computing, by the one or more computers, a carbon emissions value for hauling the waste material to be disposed of to that waste processing facility; and (b) identifying on a screen to the user a first waste processing facility in the list, wherein the first waste processing facility has a lowest carbon emissions value compared to other waste processing facilities in the list; allowing the user to select the first waste processing facility for the waste diversion project; and tracking, by the one or more computers, a plurality of waste diversion process streams of the waste material from the site location of the waste diversion project to the first waste processing facility.

The identifying on a screen to the user a first waste processing facility in the list can be: sorting, by the one or more computers, the list of waste processing facilities based on the computed carbon emissions value; and placing the first waste processing facility at a top of the list of waste processing facilities. The identifying may be otherwise highlighting the first waste processing facility such as by presenting the first waste processing facility in a different color than the other facilities in the list, drawing a box or otherwise flagging the first waste processing facility, and other highlighting techniques.

The method can further include: presenting in the list of waste processing facilities a second waste processing facility, wherein a second carbon emissions value of the second waste processing facility is greater than the lowest carbon emissions value of the first waste processing facility; and when the user attempts to select the second waste processing facility for the waste diversion project, displaying a message on a screen to the user indicating the second waste processing facility does not have the lowest carbon emissions value. Further, the method can include: asking for confirmation before allowing the user to select the second waste processing facility for the waste diversion project.

With the carbon emissions information, the method can include: generating, by the one or more computers, a report presenting a total of carbon emissions incurred by the waste diversion project.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 29 shows an example pricing grid for the FIG. 28 sign-up process.

DETAILED DESCRIPTION OF THE INVENTION

The present invention provides for an on-line waste management tool that fill the need of providing a reliable reporting and tracking system. The user of the tool, whether the user is a contractor, government body, a recycler, a manager or owner of a property, or other user, is provided with consistent, accurate information and data. The present invention provides real-time communication between these parties and streamlines the waste management and diversion process. A sustainable construction waste management plan is maintained with real-time and historical data, charts, graphs, and reports.

Figure 1:
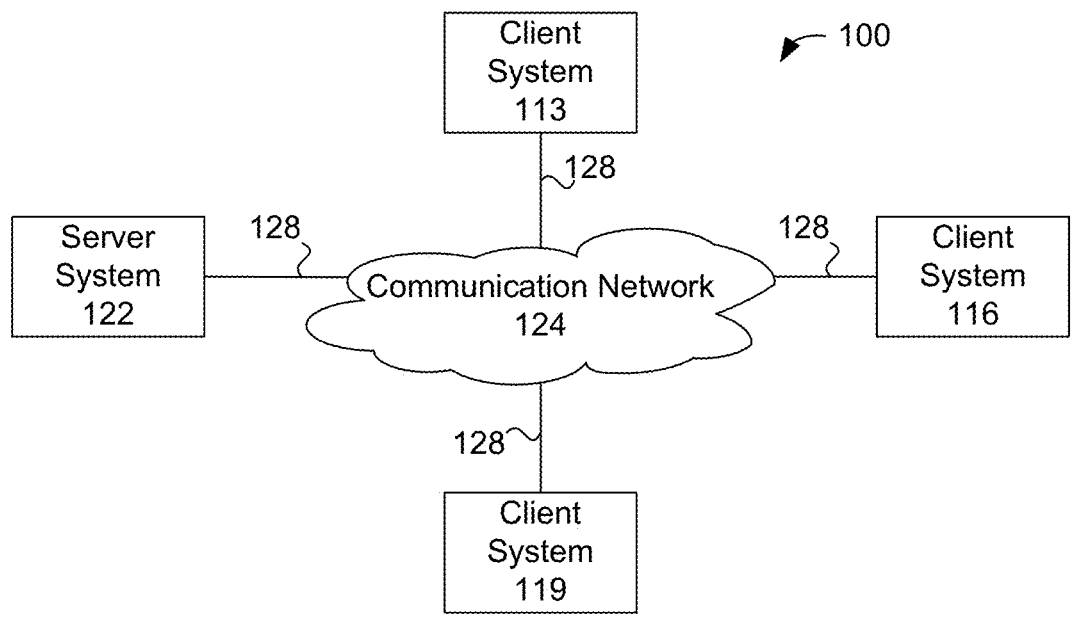
FIG. 1 shows a block diagram of a computer system embodying the present invention.

FIG. 1 is a simplified block diagram of a distributed computer network 100 incorporating an embodiment of a waste management and recycling tracking system of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124. The system can be implemented in a "cloud computing" system in which the components and functions of the computer system are distributed across a plurality of computers or servers, interconnected by a network.

According to the teachings of the present invention, client systems 113, 116, and 119 enable users to access and query information stored by server system 122. In a specific embodiment, a "Web browser" application executing on a client system enables users to select, access, retrieve, or query information stored by server system 122. Examples of Web browsers include the Internet Explorer browser program provided by Microsoft Corporation, the Firefox browser provided by Mozilla, the Chrome browser provided by Google, and others.

Figure 2:
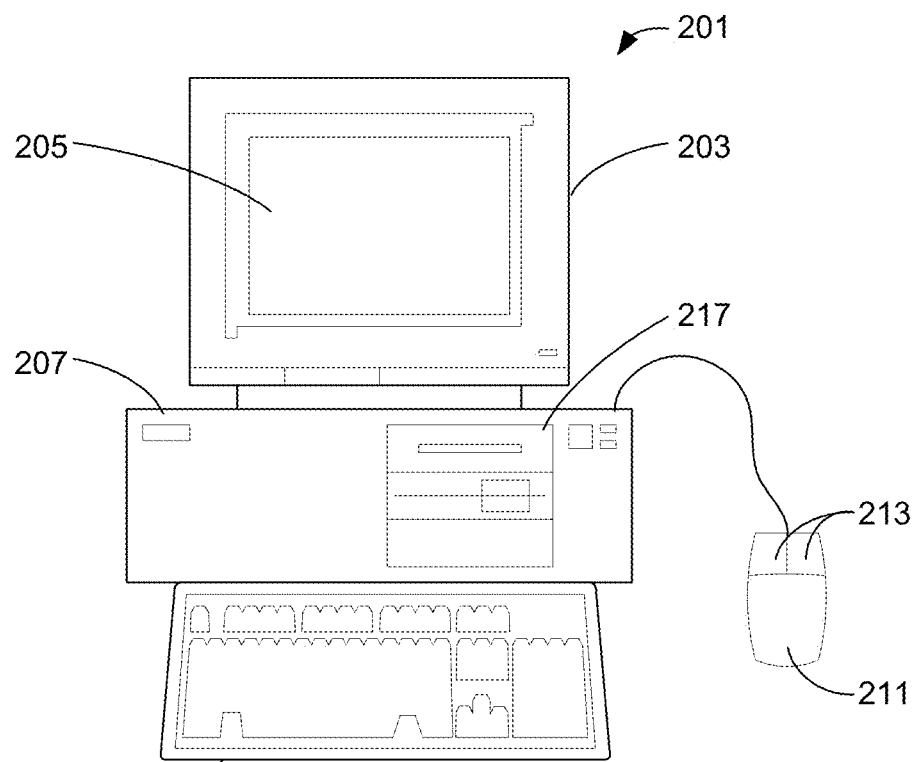
FIG. 2 shows a client or server system used in an implementation of the present invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

Some client devices include desktop and laptop computers, kiosks, thin clients, set-top boxes, nettops, game consoles, handheld PCs, personal digital assistants (PDAs), smartphones, and tablets. Some examples of smartphones include Apple iPhone, Google Android devices, Rim BlackBerry, and others. Some examples of electronic tablets include Apple iPad, Dell Streak, HP TouchSmart, Toshiba Portege, Fujitsu Lifebook, Lenovo IdeaPad, Toshiba Libretto, Amazon Kindle, Sony Reader, Barnes & Noble Nook, Microsoft Courier, and others. These and other client devices can connect via the Internet to a waste management and recycling tracking system of the invention. Any trademarks listed in this patent application are the property of their respective owners.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
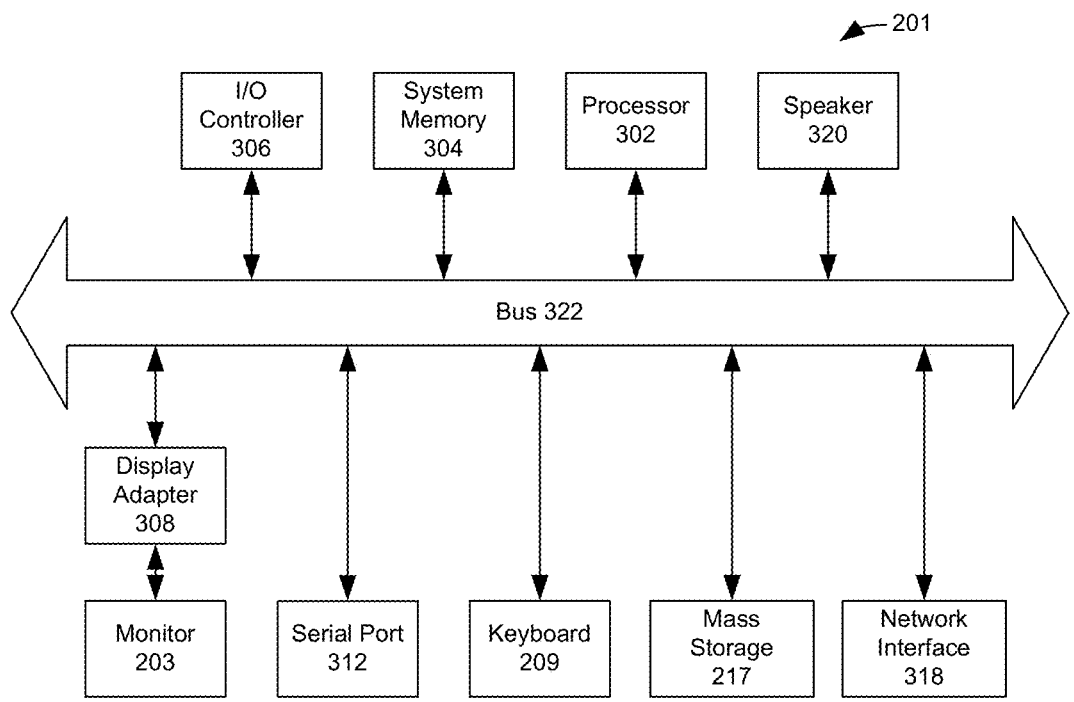
FIG. 3 shows a system block diagram of the client or server.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows, 8, Windows CE, Windows Mobile), Linux, HP-UX, UNIX, Sun OS, Solaris, Mac OS X, Apple iOS, Google Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples), near field communication (NFC), radio-frequency identification (RFID), mobile or cellular wireless (e.g., 2G, 3G, 4G, 3GPP LTE, WiMAX, LTE, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a Web browser executing on a computer workstation system, a user accesses a system on the World Wide Web (WWW) or Web through a network such as the Internet. The Web browser is used to download Web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

A Web site provides an on-line tool through which waste management or diversion projects can be managed and coordinated for the various parties associated with the project by users with different responsibilities (or different user types). The user types of the system include a contractor user type who is the person or entity responsible for the construction and waste diversion and disposal of the materials from the project. A government body user type responsible for issuing waste diversion regulations, monitoring compliance and reporting on the effectiveness of the regulations. The government body can be a city, county, municipality, state, province, or other governmental entity. A recycler user type operates a facility accepting the materials for waste diversion. A property manager or owner user type of a property. The property can be under construction or a portion of the property (e.g., floors, section, suites, or offices) may be worked on.

Figure 4:
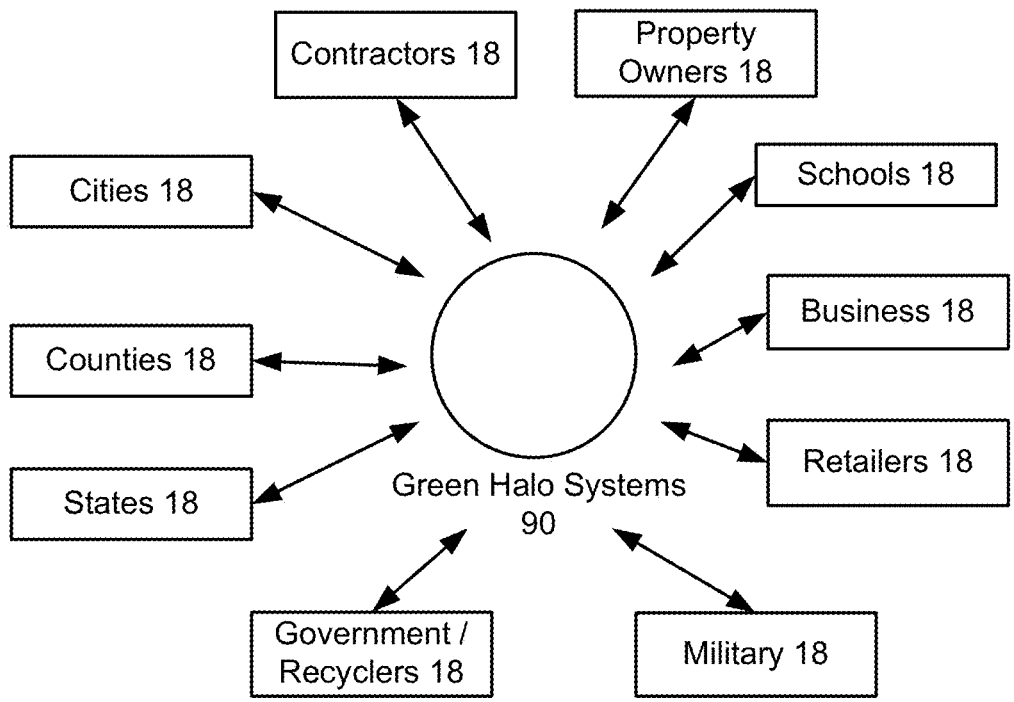
FIG. 4 shows the functional relationship between the Web site of the on-line system and a plurality of possible users.

FIG. 4 shows a Web site 90 implementation of a system of the invention. The Web site can be accessible via a URL such as www.greenhalosystems.com. The Web site is implemented using a server and managed by a Web site administrator. A number of users are connected via a client device to the Web site server. These users include the user types described above including contractors, various government bodies, recyclers, and property owners.

Figure 5:
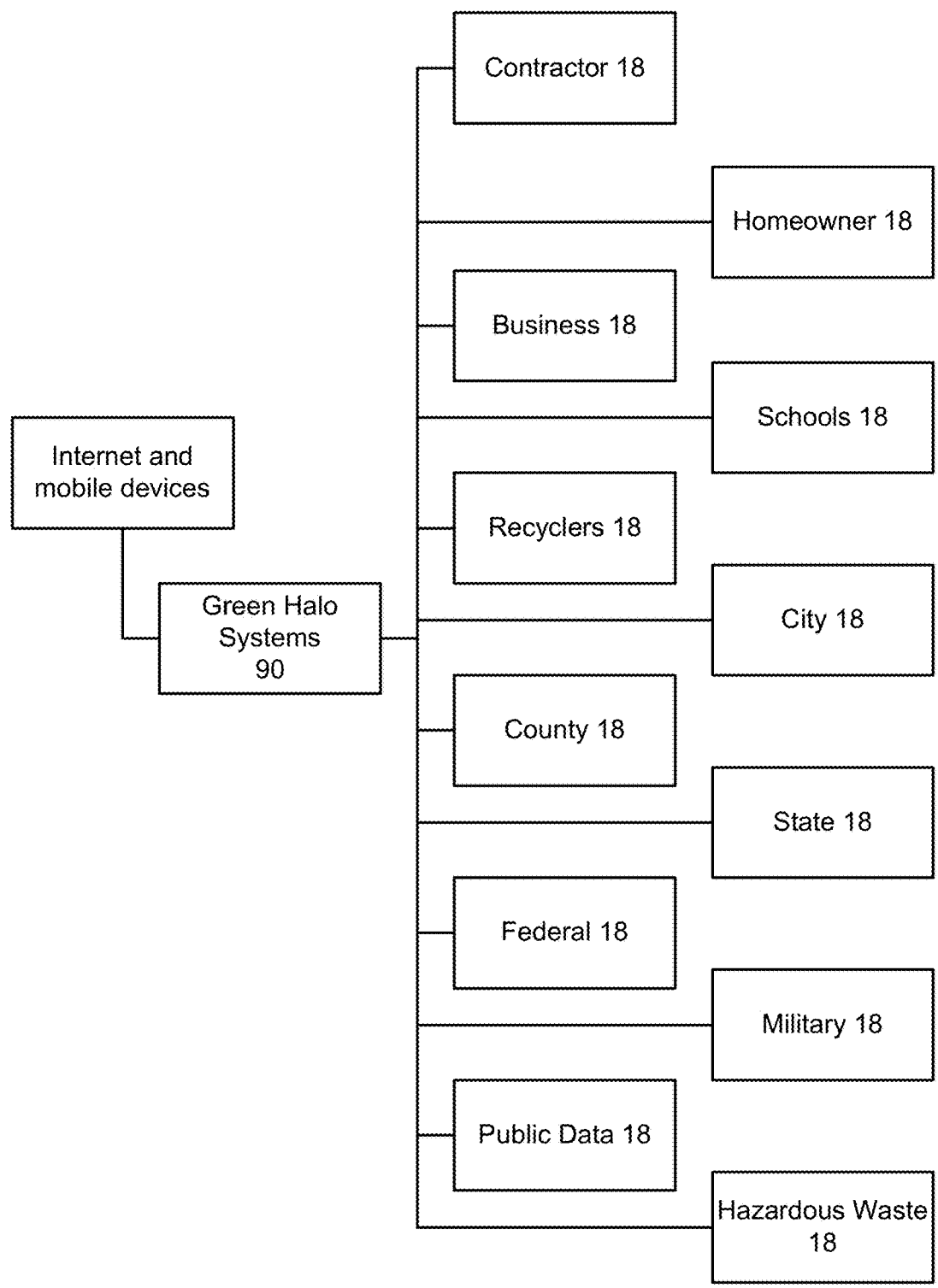
FIG. 5 is a block diagram of top level structure of the web-based software for the Web site, its users, and Internet and mobile channels to communicate with the users.

FIG. 5 shows in block form the top level structure of the Web-based software for the central Web site 90, the possible users 18 and Internet and mobile communication channels. Some top-level components and functions of the system include:

Notifications: Notification screen that displays all submitted waste management plans submitted by contractors within the service area of the facility. Notification screen displays Green Halo (GH) tracking number of project, address of project, city, square footage, value, number of materials, estimated start date, building type, status of project submitted to city, indicate a method of moving the waste from the project site (e.g., roll off, self haul, or both), indicate whether project is a Leadership in Energy and Environmental Design (LEED) project.

LEED is an internationally recognized green building certification system, providing third-party verification that a building or community was designed and built using strategies intended to improve performance in metrics such as energy savings, water efficiency, carbon dioxide ($CO_2$) emissions reduction, improved indoor environmental quality, and stewardship of resources and sensitivity to their impacts.

Address and Tracking number are hyperlinked to display the entire plan. Number of materials displayed is hyperlinked to display the materials of the newly submitted plan.

Types of messaging for notifications to users of the system include: sending messages to entire staff, sending messages to specific salesperson, and sending messages to facility staff, or any of a combination of these. Settings, configuration, and assignment of users to this notifications section.

Sales Team: Create sales team allows the sales manager to create a salesperson hierarchy by region, state, county, locality, or city. Sales manager can assign projects submitted by contractors that appear in the notifications section to be assigned to a particular salesperson. Sales manager can assign services to a salesperson. Sales manager can assign territories to a salesperson by region, state, county, city, or other territories. Salespeople should have user access levels from the top of the tree to the bottom, and salespeople can access only what the sales manager assigns to them.

In an implementation, there are at least two master administrators (or admins) at the corporate level. This allows the system to proceed normally even in the event that in the event sales admin, sales manager, or salesperson is terminated, cannot show up for work, or assignment changes. The sales manager has the ability to transfer projects to another salesperson. System allows sales manager to view salesperson statistics from the top of the sales tree to the bottom. System allows salespeople in the field to download and view schedule assigned by sales manager, update status of the sales call (e.g., visited, not available, closed sale, and so forth), or upload pictures of the project.

Messaging for sales team includes: send messages to entire staff, send messages to a single staff member, send messages to clients, view all messages from clients to sales staff, to create pre-canned message (to notify recipients of an emergency or other situation), and combinations of these. Settings, configuration, and assignment of users to this sales team section.

Plans: This page allows the recycling facility to view plans created by the facility for their clients. System is similar to the contractor and city views. System allows recycling facility to create plans for clients, view pending, active, past, and plans submitted for final. The recycling facility can also enter tickets for projects. Main display screen also shows what sales services were applied to the clients as well (e.g., roll off service, recycling, Bagster (www.thebagster.com), PackRat (www.1800packrat.com), and so forth). Services are created in the services section and assigned to the salesperson who then assigns it to the client.

Messaging for plans includes: send messages to all clients and send messages to a specific client, and combinations of these. Settings, configuration, and assignment of users to this plans section.

Facility: Create diversion report for facility which will then be published for viewing by subscribing cities and counties. More details of the diversion reporting are available. Statistics for facility, by materials, by method of recycling, by disposal method, exported materials, and other categories. A disposition list can be created that list the final disposition of the materials received at a facility. List facility staff. List services provided by this facility. Overall statistics of this facility.

Messaging for facility includes: send messages to entire staff and send messages to single staff member. Settings, configuration, and assignment of users to the facility section.

Services: This section allows the company to enter a list of services they provide of which the sales manager will select from and assign to the salesperson. This list populates the services this facility provides for clients. This list can be changed at any time. Settings, configuration, and assignment of users to this services section.

Material search: This function allows a sales manager, facility manager, and other to search all plans submitted by contractors in the service region of the facility, to find a specific material or materials. For example, if a recycling facility has a multimillion dollar piece of recycling equipment that requires large amounts of material to be fed into it, and that facility is currently running low on whatever material that piece of equipment needs, the facility manager can search all active plans submitted by contractors to find which ones have the material they need to feed the machines and then contact that contractor in an effort to obtain those materials for the recycling facility. This may take the form of offering contractors a discount for one week on "all wood" recycled will be half price to recycle or even "accepted for free." Typically, it is cheaper for the facility to offer discounts on materials or even accept them for free instead of taking down the machine.

Government (e.g., cities): This section allows the recycling facility to interact with the cities or other governmental entities in its service area. It allows the facility to view which cities have subscribed to the system to view their diversion report. It allows for a recycling facility to invite a city to view a published diversion report. It allows the recycling facility to view the language the city has included in their franchise agreement the city is displaying to the contractors to make sure the city is enforcing it properly and displaying it correctly.

Messaging for cities includes: send messages to all cities in my service territory, send messages to a specific city, and send messages to a specific city staff member, and combinations of these. Settings, configuration, and assignment of users to the cities section.

Statistics: View statistics for functions related to this facility. Statistics of sales team and salespeople individually. Statistics of materials. Statistics of which contractors use the facility the most.

Messaging: Messaging to communicate with users in this location. Messaging to communicate with corporate. Messaging to communicate from admin to each section. Messaging to communicate with individuals in this system.

Settings: Settings, configuration and assignment of sales team. Settings, configuration, and assignment of facility. Settings, configuration, and assignment of services. Settings, configuration, and assignment of users of the system.

Figure 6:
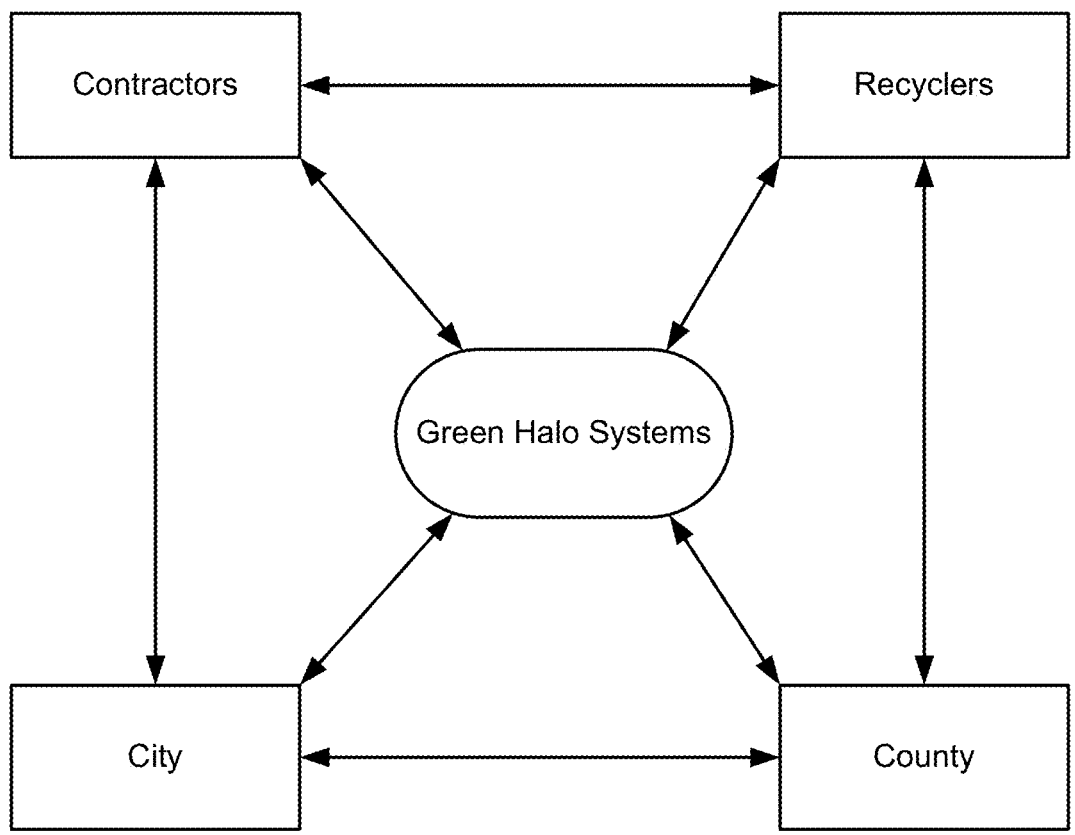
FIG. 6 illustrates the communication flows among the Web site operator, and some exemplary types of users.

After logging into the Web site, the user is directed to one of the user Web page for the user type (e.g., contractor, government body, recycler, or property manager or owner). With each Web page sector there are particular functions, operations, interactions, and data which are related to the type of user. Generally speaking, a user enters data through the Web pages in the user's sector and the data can appear in other user sectors in formats which are useful and convenient to the users of the other sector. For example, FIG. 6 illustrates the communication flow among the Web site operator (Green Halo Systems in this description), and some different types of users, contractors, recyclers, property managers or owners and cities.

Descriptions of the system model block diagrams and some example process flows for the different users. Some specific flows are presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

With a system of the invention, cities can: expedite the waste diversion process; review approve, deny, or comment on waste management reports from a computer very quickly; get real-time recycling statistics on a specific project, contractor, or city; user admin, assign settings, and users; create a customized list of approved facilities (such as facilities the city has franchise agreements with); reduce carbon footprint, and move to paperless tracking system. Contractors can: have one easy to use format for plan; submit waste management plans from a computer or in the field; find the nearest recycling facility to handle material; create and track multiple projects, and view recycling statistics for the company and specific projections. Recyclers can: have one tracking number to enter; no paper tickets; eliminate long lines at weigh station; diversion reports are created real time; no more customer requests for lost tickets because ticket images (such as from a scan or picture) are available on-line; track customer and material activity; manage franchise agreement; and project profiles.

The system is an on-line waste management reporting and tracking system. There has been no standardized system for waste management diversion reporting and tracking. There is an immediate need for streamlined communication system between contractors, recycling facilities, cities, and counties.

The system benefits cities, counties, contractors, recycling centers, schools, business, and environment. The system provides a standardized reporting in an easy to use on-line format allowing users to: complete step-by-step waste management diversion plan (so waste material is diverted from a dump and recycled instead); view list of approved recycling facilities; enter and track recycling tickets; meet compliance requirements by tracking waste diversion from beginning the end of project; automatically convert material quantities (e.g., from cubic yards which contractors are familiar with to tonnage which may be specified by cities and regulations); create visual representation (e.g., pie charts and other graphs) of waste management plans and how contractors are complying with plan; meet project goals with color-coded compliance tracking; maintain copies of tickets on-line, viewable by both contractor and city officials; waste management plan acceptance, denial, or comments by city after submission by contractor; review the compliance report and schedule the final inspection; and create tracking number that follows debris to the state level and beyond allowing real-time recycling and diversion data.

In an implementation, the system has features: open source system; works on all mobile devices; communication tool for cities, contractors, and recyclers; organized information and news; customizable configurable system; modular, adaptable, and scaleable; one central hub; allows cities to keep tabs on hauling and demolition services; eliminates faulty reporting; allows cities to verify reporting; allows recyclers to manage franchise agreements; generates leads for all levels of service; reduce carbon footprint (e.g., by listing, finding, and suggesting recycling sites that are closer to a project location); paperless green system; material management system, and documentation archiving.

System Model Block Diagrams for Contractors

Figure 7A:
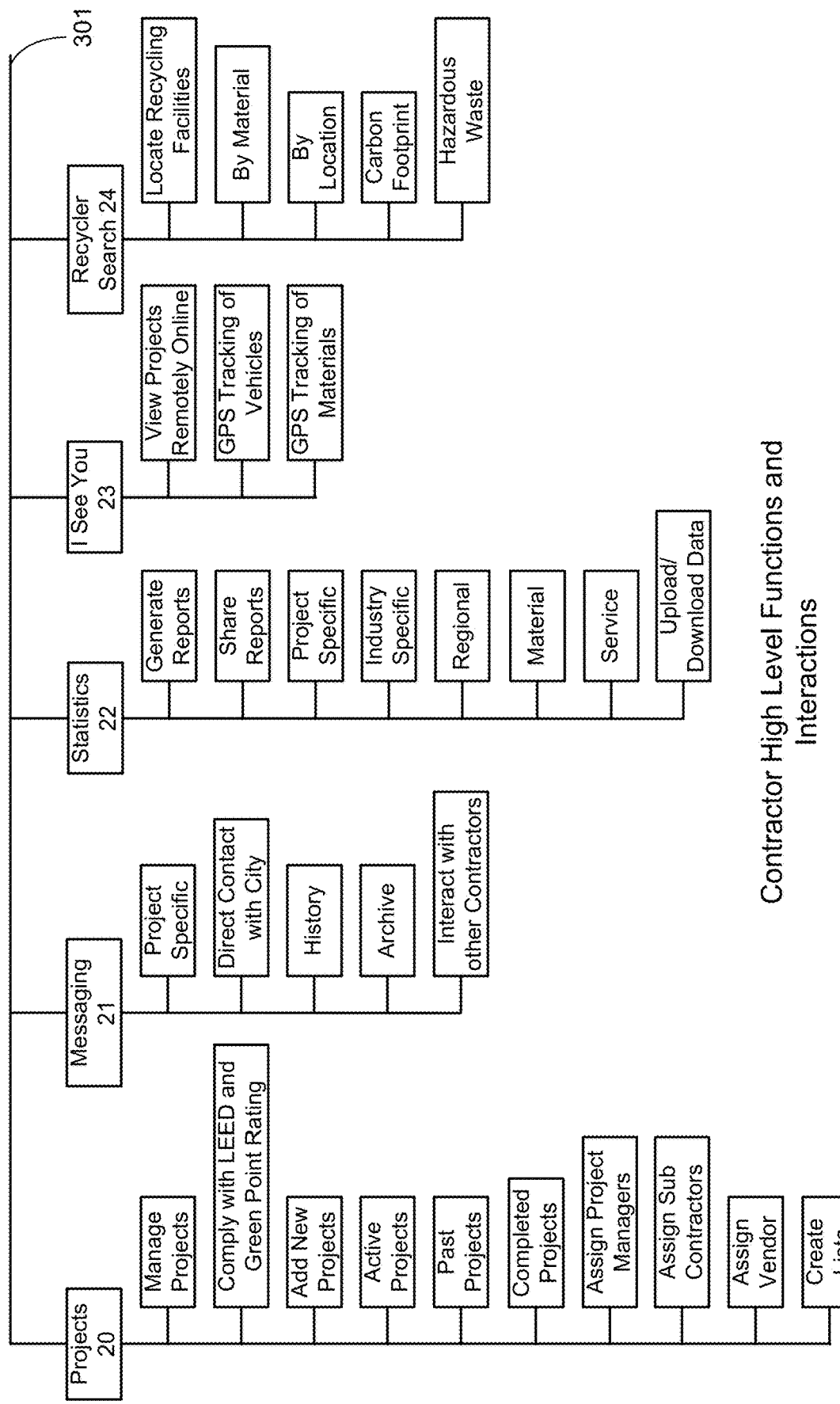
FIG. 7 shows a high-level system model block diagram for the software for contractor users of the on-line system.
Figure 7B:
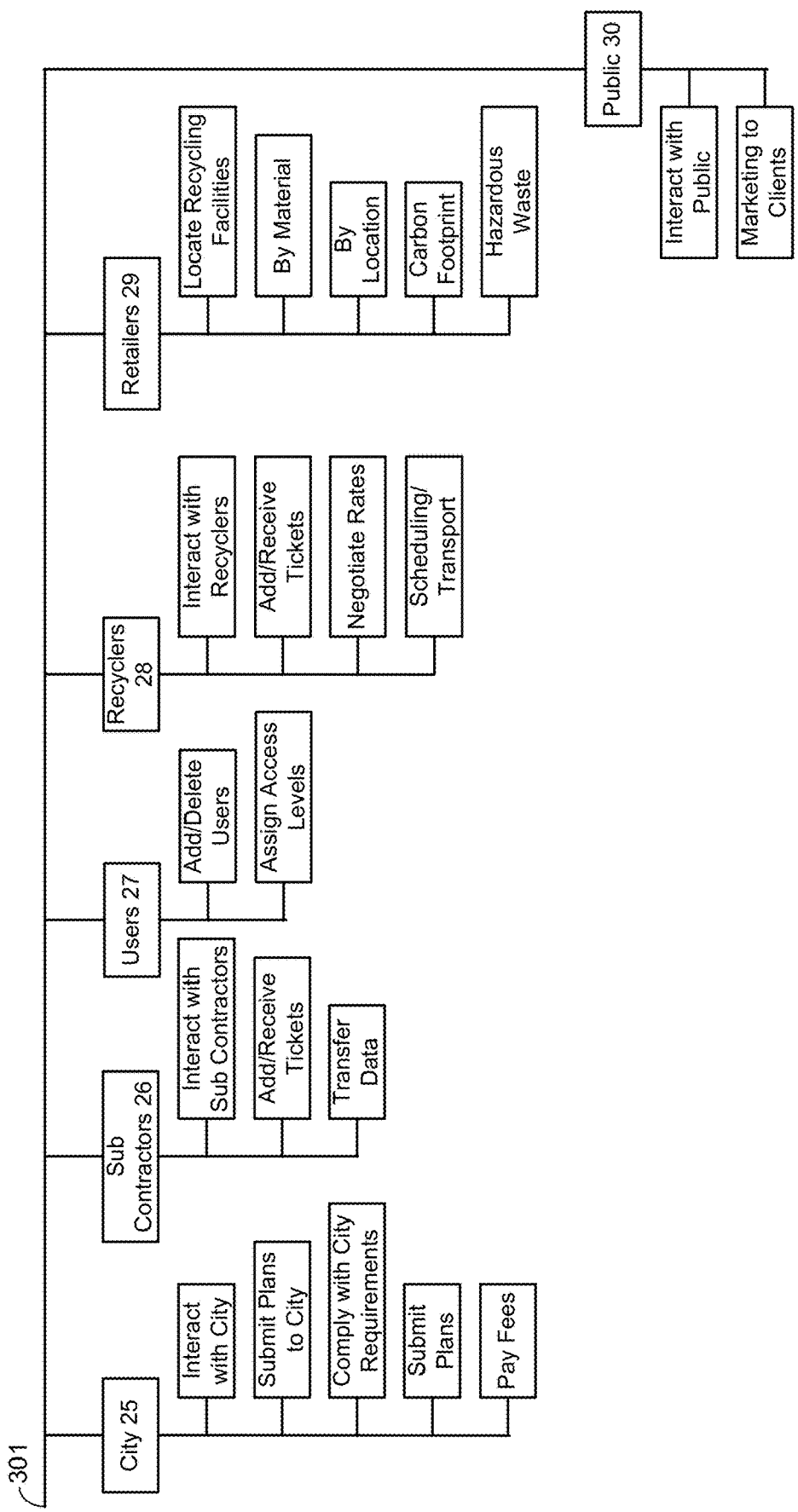

A system model block diagram for the contractor, the person or entity responsible for the actual construction and waste diversion and disposal of the materials from the project, is shown in FIGS. 7a-7b at a high level. The system model block diagram shows several functions, operations, and interactions, including with other users and Web page sections. A high-level view of the contractor system model block diagram is divided into contractor groups as shown in FIGS. 7a-7b. The groups include projects 20, messaging 21, statistics 23, monitoring 24, recycler search 22, government body (city) 25, subcontractor, users 27, recyclers 28, retailers 29, and the public 30. FIG. 7a continues on FIG. 7b, as designated with reference number 301.

Figure 8:
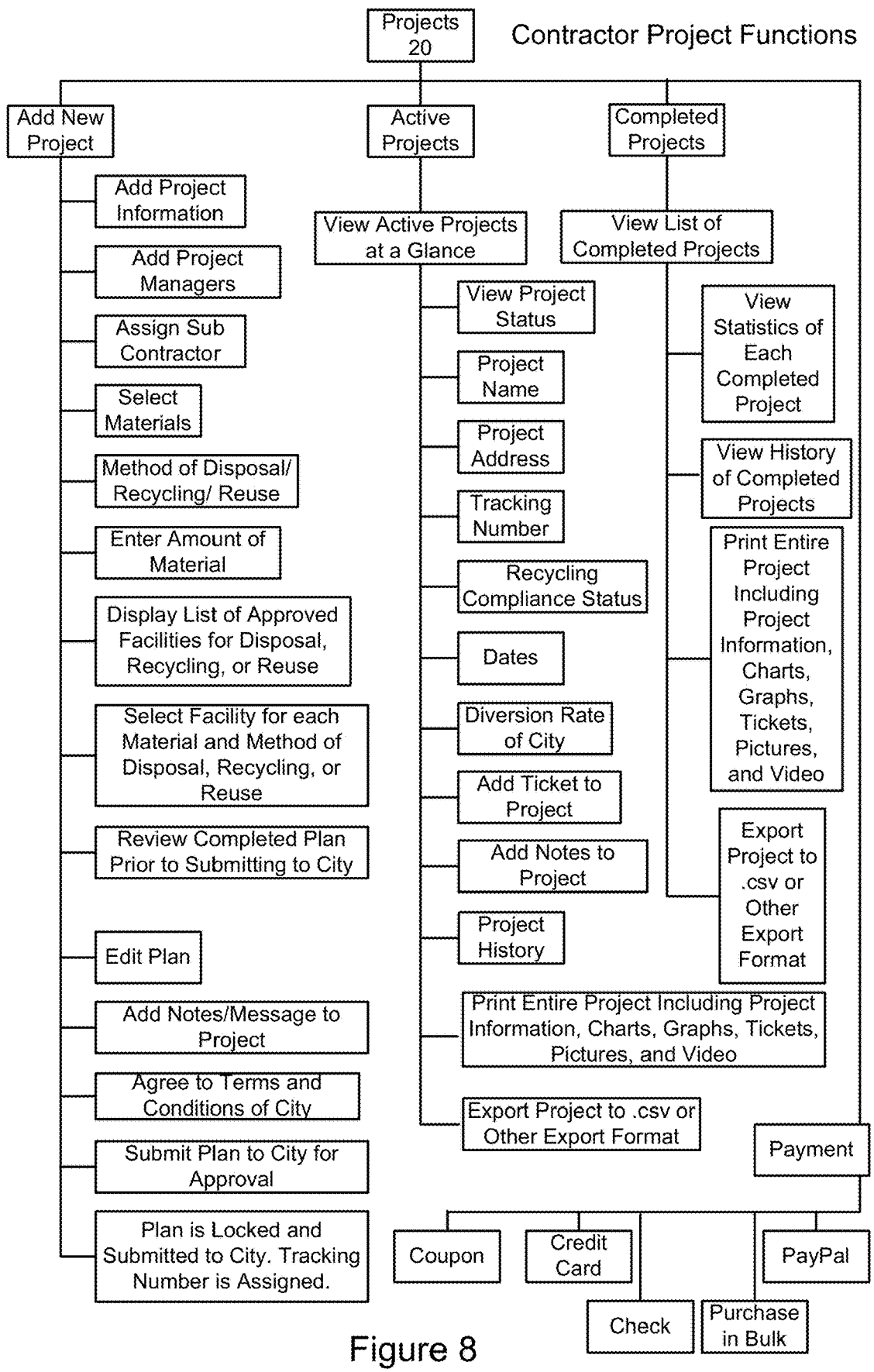
FIG. 8 shows the system model block diagram for the projects group in FIG. 7.

The projects group 20 as illustrated in FIG. 8 for managing a contractor's projects, includes functions, operations, and interactions adding a new project, viewing active projects, viewing past and completed projects, and payments. For a contractor to add a new project to the system, the contractor must then add information about the new project, which is prompted by a new project plan template, assign the project managers and the subcontractors to the new project, select the materials involved with the new project, describe how each material is to disposed, recycled and reused, enter the amount of each material, select the waste management facility which is to dispose, recycle or reuse each material for a list of approved facilities. The contractor can review and edit the new project plan with notes and messages. Before electronically submitting it to the government body having jurisdiction over the project, a city in this example, the contractor is prompted to accept with the terms and conditions imposed by the city for such construction projects. Only after the terms and conditions are accepted is the plan accepted for submission. The submitted plan is assigned a tracking number and locked so that no more changes are accepted. The plan then awaits approval from the city.

Figure 12:
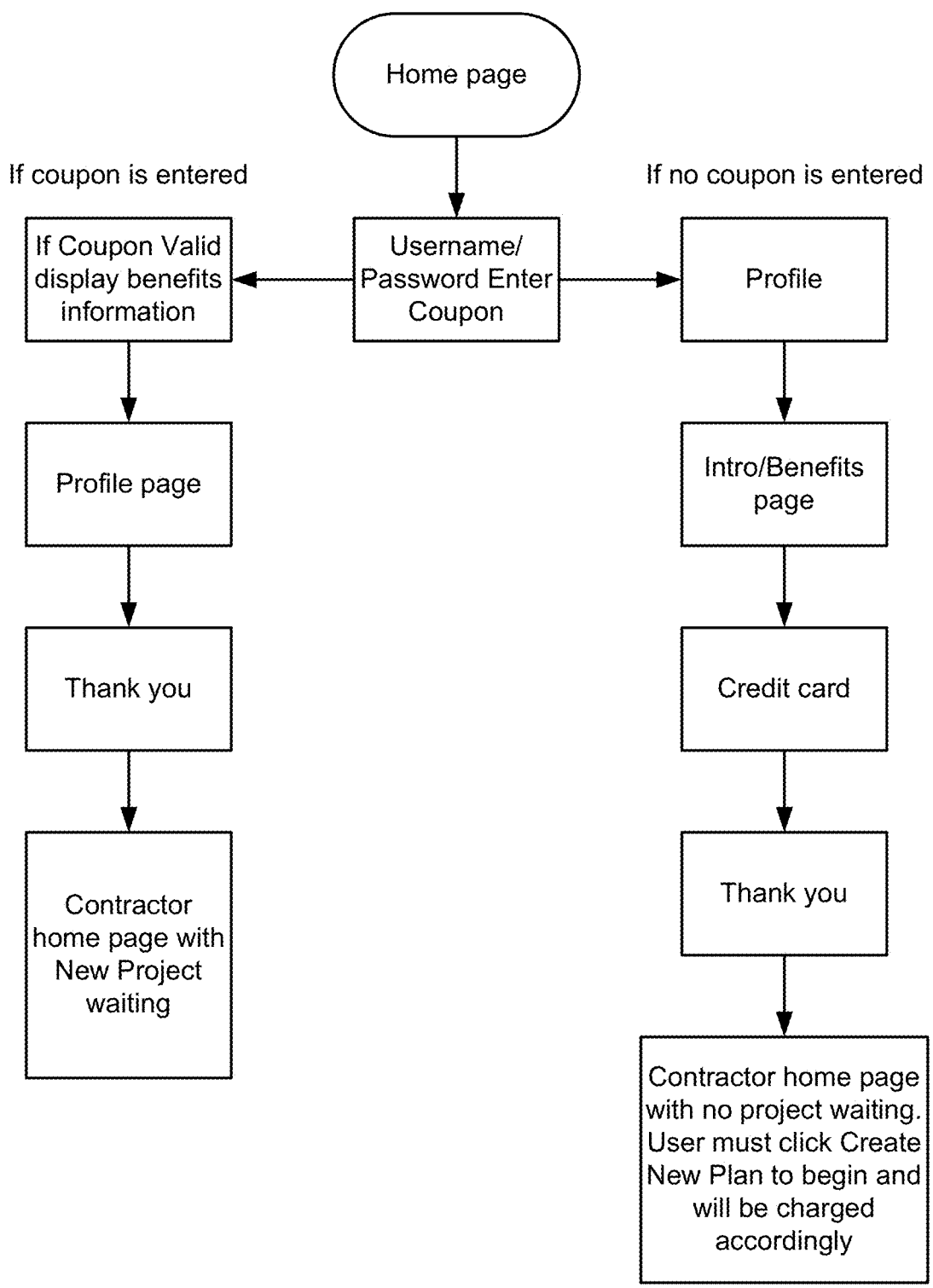
FIGS. 12-15 show process flows of how a contractor creates a new project on the described on-line system.

FIGS. 12-15 illustrate process flows of how a contractor creates a new project on the described on-line system. FIG. 12 shows the process flow from the contractor's home page. The contractor enters his user password and a coupon if available. The coupon can originate from the Web site operator to encourage contractors to freely use the on-line system. The coupon may also be known as an access code. Additionally, these may be purchased by a governmental entity and then given contractors to encourage them to use the system.

If a coupon is entered and is valid, information on the benefits of using the system is displayed and a page is displayed for the contractor to enter data to profile the new project. The submission of the profile page from the contractor is acknowledged and the contractor is sent back to his home page with a new project waiting status. On the other hand, if no valid coupon is entered, the profile page is displayed for the contractor to enter the project information. Then information on the benefits of using the system is displayed with a page for the contractor to enter his credit card information so that the contractor can pay for use of the described system for the new project. After the credit card information is submitted and cleared, an acknowledgement is sent to the contractor who then returns to his home page. In this case, there is no new project waiting status and the contractor must engage a create new plan function.

Figure 13:
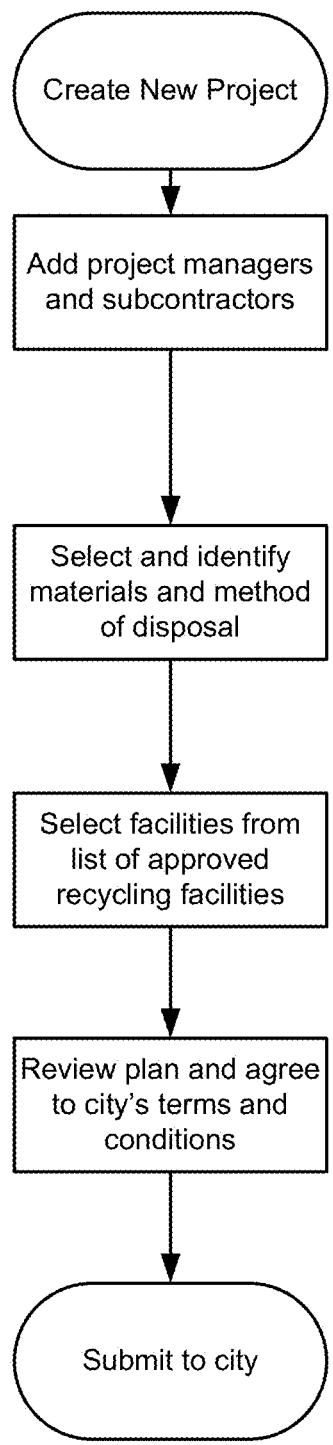
Figure 14:
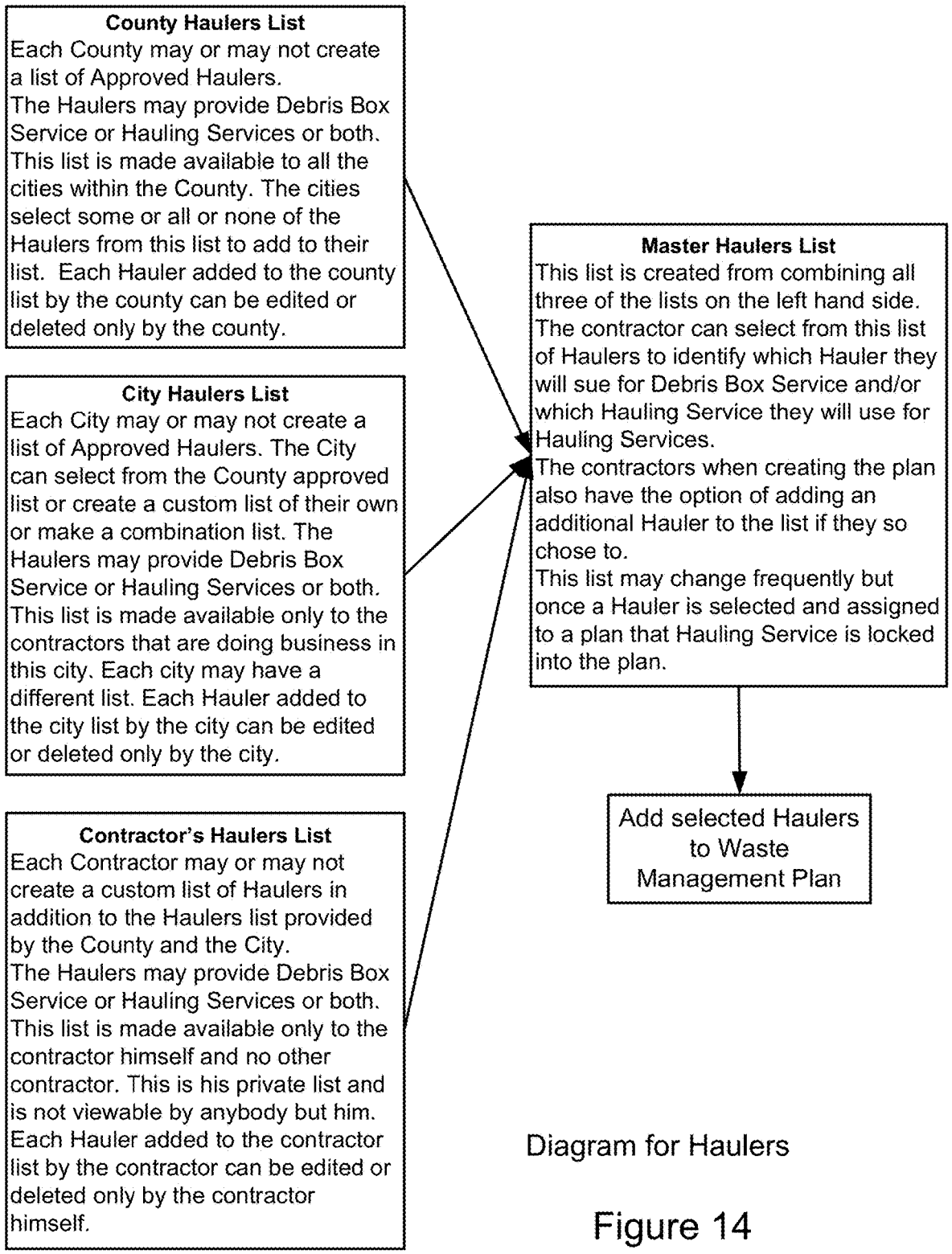

FIG. 13 illustrates the process flow after the contractor has initialed a new project on the described on-line system. After defining the new project and its plan, the contractor adds the project managers and subcontractors. FIG. 14 illustrates how the list of subcontractors is created for the contractor. In this example a master list of a certain type of subcontractor, waste material haulers, are created from lists of haulers approved by the county, city and the contractor.

Returning to the process flow of FIG. 13, the materials of the project are selected and identified with the method of reuse, recycling or disposal for each material. The waste management facilities which are to accept and process the waste materials are selected from a list of approved facilities which are conveniently generated and displayed to the contractor. The project is reviewed by the contractor and the terms and conditions of the city are displayed. If the contractor agrees, the plans are submitted electronically through the system to the city.

Figure 15:
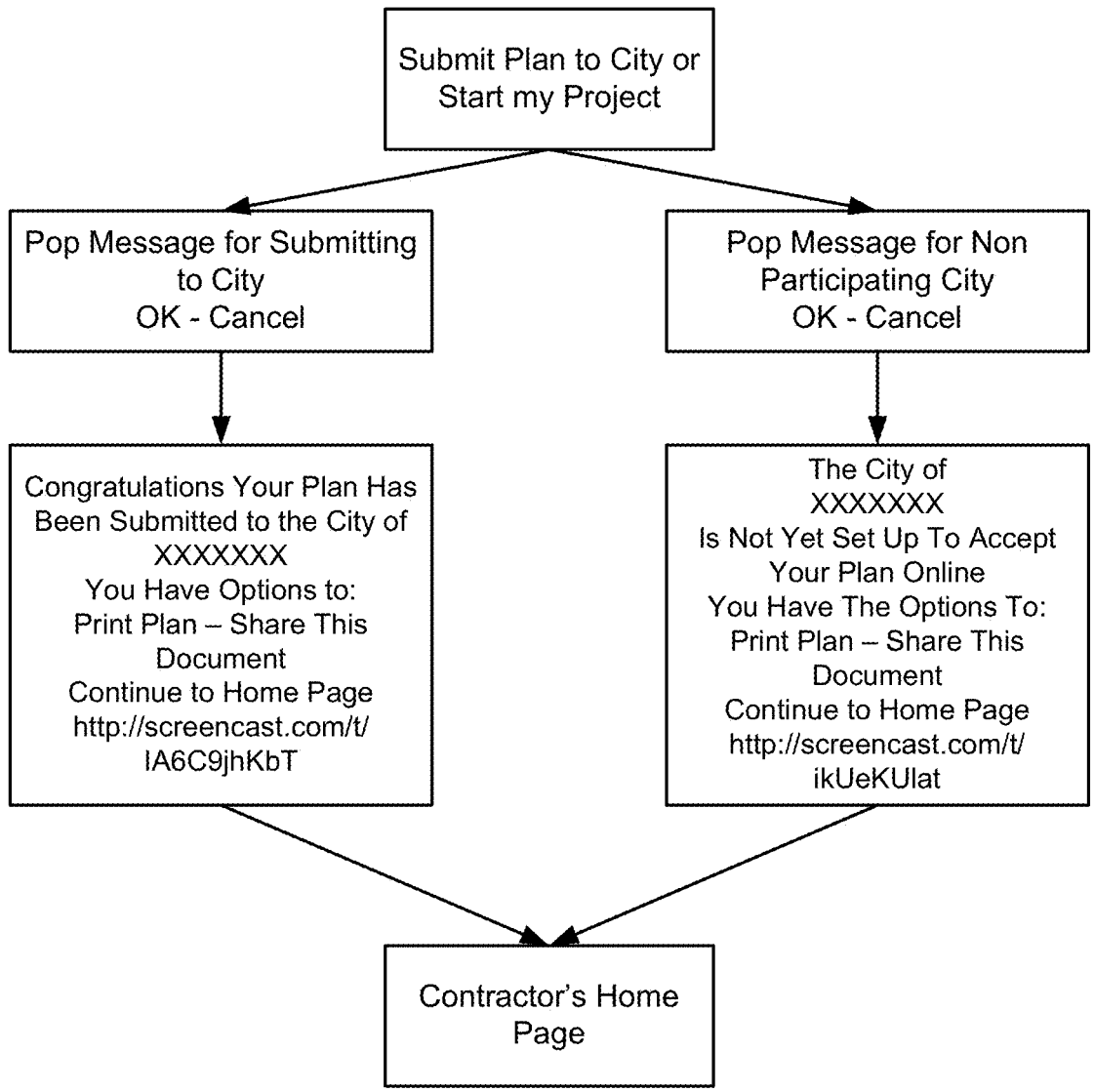

FIG. 15 shows a combination show chart and display of the difference in the submission of a project plan to a city which is a user of the described on-line system and a city which is not. In the former case, the contractor receives an acknowledgement that the plan has been received by the city and the contractor has the option of printing the acknowledgement, of sharing the acknowledgement, say, with the owner or manager of the project property, or of continuing to the contractor's home page on the system Web site. In the latter case, the contractor receives a notice that the city is not ready to receive the project plan. The contractor also has the option of printing the notice, of sharing the notice, or of continuing to the contractor's home page.

Continuing with functions, operations, and interactions of FIG. 8, the contractor can view the contractor's active projects, i.e., projects which the contractor has started but not completed. The view includes the data and information from the project plans. The information includes the status of each project, the names and addresses of the project property, the tracking numbers of each project, the status of recycling compliance for the materials from each project, the waste diversion rates of the cities having jurisdiction of each projects, any significant dates for each active project, and the project histories. The contractor can modify the information for each of the active projects by adding notes and even "tickets" to a project. A ticket is typically purchased from a recycler for a certain amount of selected material to be delivered to the recycler's facility for disposal, recycling or reuse. All active project information can be printed including charts, graphs, tickets, pictures and even videos. The project information can also be exported in some export format, such as CSV (comma-separated values), Excel database file, or other data formats.

The contractor can also view the contractor's completed projects. The list of completed projects allows views of the statistics generated from the data of each project and the history of each project. As in the case of active projects, the completed project information can be printed and exported. With the payment functions, operations, and interactions, the contractor can pay for the addition of the new project to the system by coupon, i.e., a free or discounted access by the operator of the system, by credit card, by check, by Paypal or by a "purchase in bulk" through which the contractor can pay for many projects (e.g., payment for the needs of multiple projects in a single financial transaction).

Figure 9:
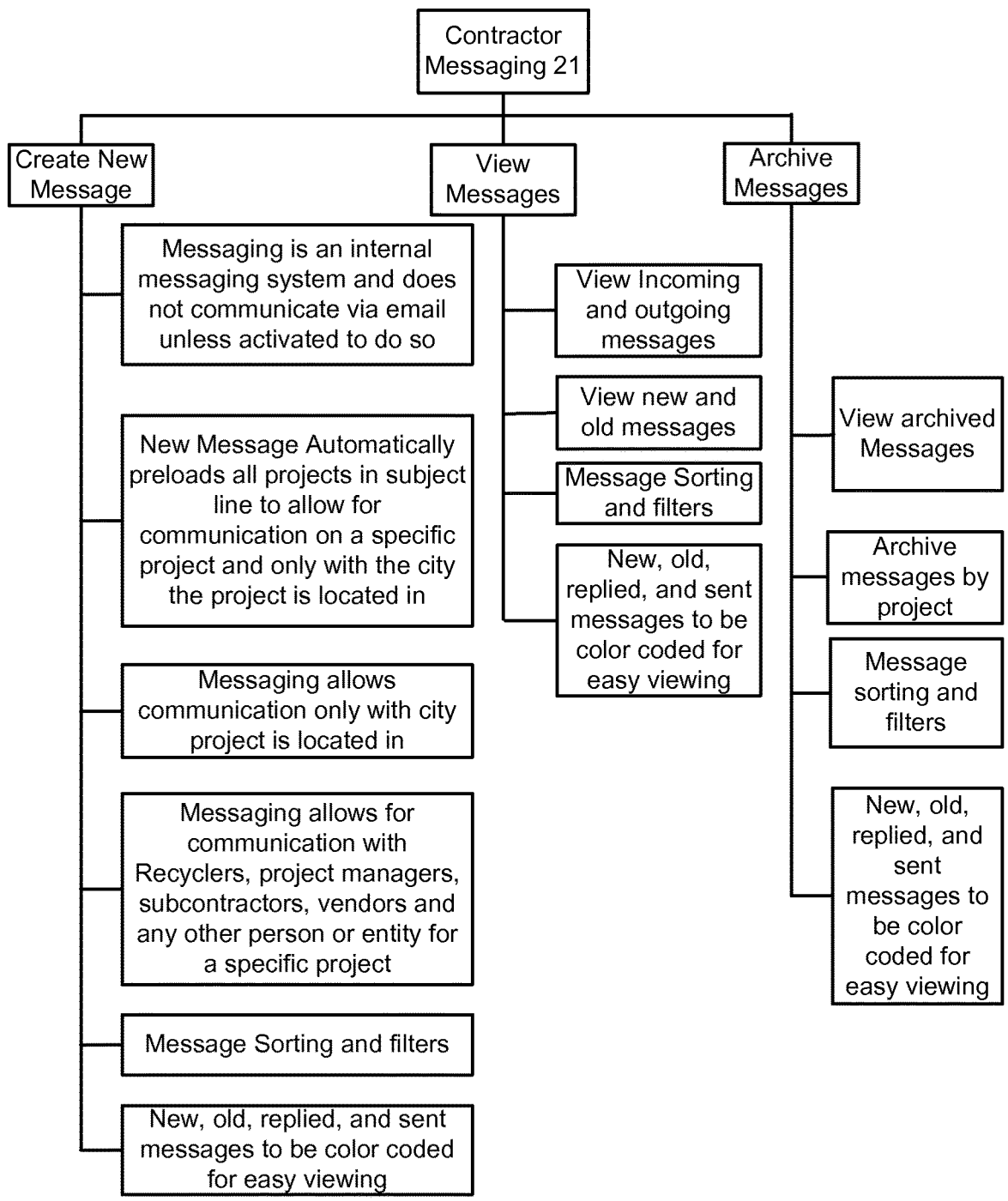
FIG. 9 shows the system model block diagram for the contract messaging group in FIG. 7.

Returning to the high-level view of the contractor system model block diagram illustrated in FIGS. 7a-7b, the contractor messaging group 21 allows the contractor can manage messages related to each of its projects. FIG. 9 shows more details of the functions, operations, and interactions of the messaging group 21. In creating a new message, the message is kept internal to the system, i.e., kept within the Web site; e-mail is not used unless specifically activated to do so. For a contractor's new messages, all of the contractor's projects are generated in a pop-up box for the subject line of the message and the city in which the selected project is located is also inserted into the subject line.

By the selection of the project, communication is ensured only with the city which has jurisdiction over the selected project and with persons or entities involved with the specific project, such as the project's recyclers, project managers, subcontractors, and vendors. All messages can be sorted and filtered, and color coded whether new, old, replied to, and sent for easy viewing. For viewing messages, both incoming and outgoing messages can be viewed, as well as old and new messages. The messages can be sorted and filtered, and color coded whether new, old, replied to, and sent for easy viewing. For viewing archived messages, the messages can be viewed by project, and the archived messages can be sorted and filtered, and color coded whether new, old, replied to, and sent for easy viewing.

Figure 10:
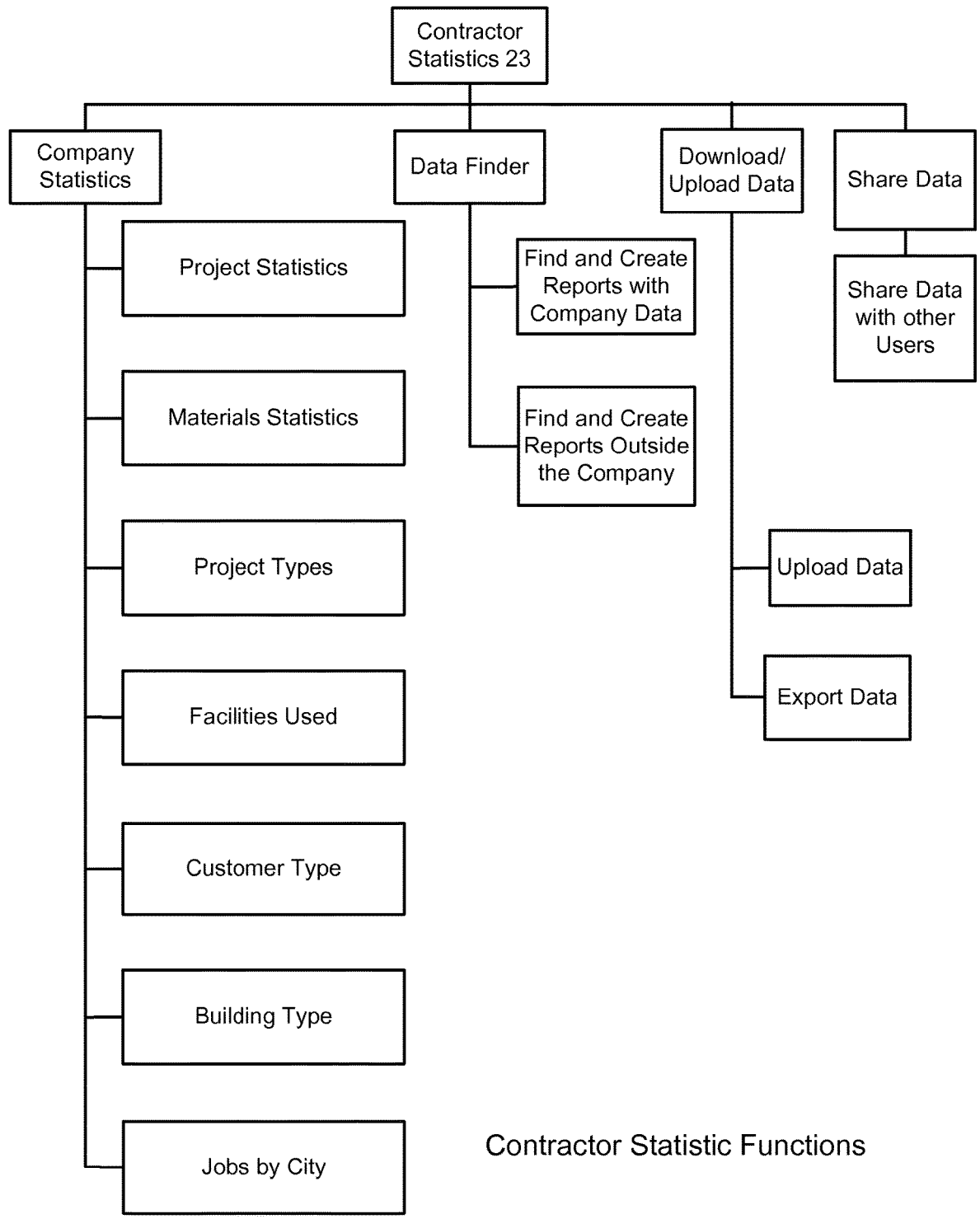
FIG. 10 shows the system model block diagram for the contractor statistics group in FIG. 7.

The contractor statistics group 23 as shown in FIG. 10 gathers and organizes the data from the contractor and its projects. There are data for the contractor's projects, the materials in the projects, the types of contractor's projects, the waste management facilities used by the contractor, the type of customer who hire the contractor, the type of buildings in the contractor's projects, and even the jobs in each project by city (assuming that a city has waste management jurisdiction over a project). The contractor statistics group 23 includes a data finder function which finds and gathers the contractor data and creates reports for the contractor. An upload-download function allows the contractor data to be uploaded and exported. The data can also be shared with other users. The contractor data can be uploaded or download for the reports.

The tracking group 24 allows a network conduit for a project to be viewed on-line, GPS tracking of vehicles associated with the contractor's projects and the GPS tracking of materials from contractor's projects.

Figure 11:
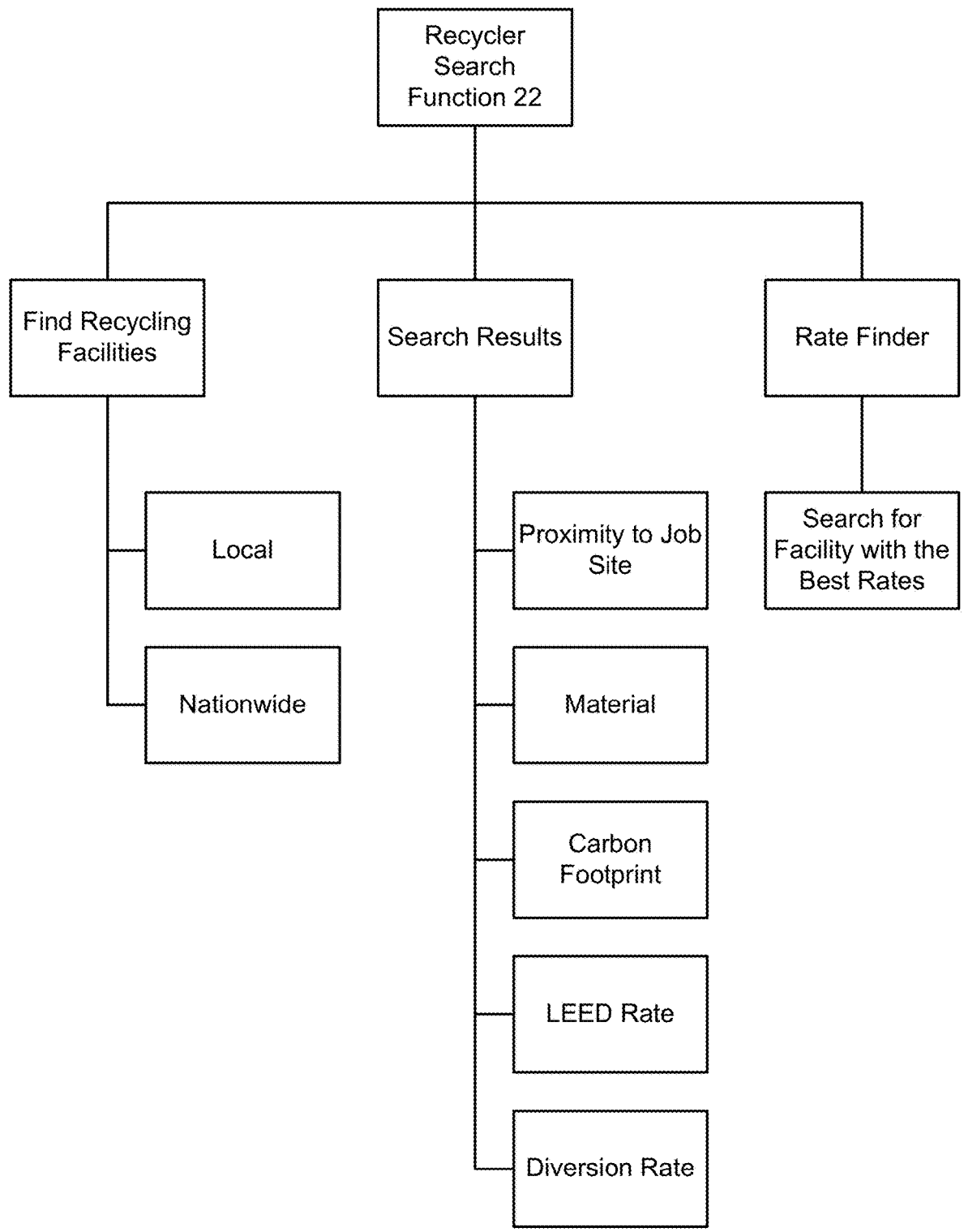
FIG. 11 shows the system model block diagram for the recycler search group in FIG. 7.

As illustrated in FIGS. 7a-7b, the contractor has a recycler search group 22 which is shown in greater detail in FIG. 11. A find recycling facility function allows the contractor to locate recycling facilities by whether a facility is "local," i.e., within a predetermined distance to the specified project or "nationwide," beyond the predetermined distance. The distance between a project and the recycling facility is determined by a link to a function of various mapping Web sites, such as Google Maps. Search results can be shown by the facility's proximity to the project, the materials the facility handles, the "carbon footprint" of the facility, the LEED (Leadership in Energy and Environmental Design) rate of the facility and its waste material diversion rate.

Figure 16:
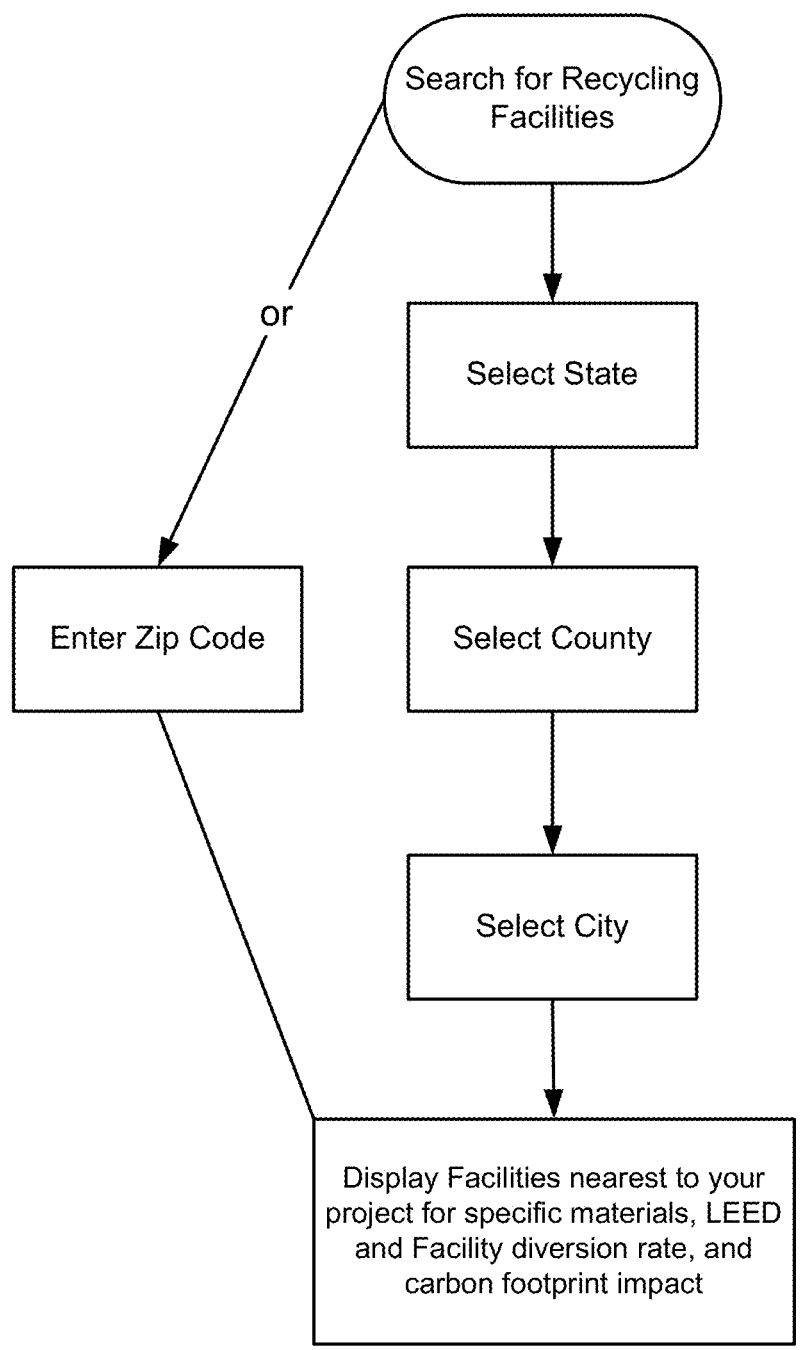
FIG. 16 show a process flow for a contractor to find a recycling facility for the contractor's project.

A rate finder function sorts the found recycling facilities by the rates they charge for the handling of the waste materials. This sorting can help the contractor in selecting facilities for a project. A process flow in FIG. 16 illustrates how a contractor can find a recycling facility for the contractor's project. The contractor starts the recycling search process and selects the state, county, and city of his project. The resulting search displays the facilities nearest the project for the specific materials of the project, the LEED and facility diversion rates, and the potential carbon footprint impact by the use of the facility. Alternatively the recycling search can be engaged by simply entering the zip code of the project.

The city group 25 includes interactions with cities, such as the submission of project plans to a city, compliance acknowledgements to a city's terms and conditions, and payments of fees to a city. The subcontractors group 26 allows interactions with the contractor's subcontractors, such as the addition and receipt of tickets which subcontractors on a project might use at a recycling facility. This allows tracking of recycling operations and costs incurred from the recycling facilities, among other benefits.

Data can also be transferred to and from the subcontractors. The users group 26 includes functions of adding or removing people who can have access to the contractor's Web pages and the stored and organized information on the contractor's projects; furthermore, the levels of access can also be set for different users. The recyclers group 28 involves functions, operations, and interactions with recyclers, including adding or removing tickets for use at recycling facilities, negotiating rates with recyclers and scheduling the transport of materials to a recycler's facility.

The retailers group 29 manages interactions with retailers and includes provisions to store sales and product information which might be useful to the contractor, to order materials and services from retailers and to create lists of preferred vendors. Finally, the public group 30 in FIGS. 7a-7b includes functions, operations, and interactions to manage interactions with the public, and to market the contractor's services to its customers.

It should be noticed that some of the contractor functions, operations, and interactions are found in multiple groups. For example, project plan submission is found in both projects and city groups 20 and 25 respectively. This cross-linking aids in the functional convenience of the present invention.

The contractor user Web site allows the contractor to submit waste management plans from a desktop computer or in the field through a mobile device, such as smart phones or any other mobile computer system. Contractors can submit their waste diversion plans to the local government for approval, choose recycling partners, store disposal tickets, track progress on their project and submit the results of their project to local government for final approval, from the convenience of a desktop or mobile computing device.

System Model Block Diagrams for Government Bodies

Figure 17A:
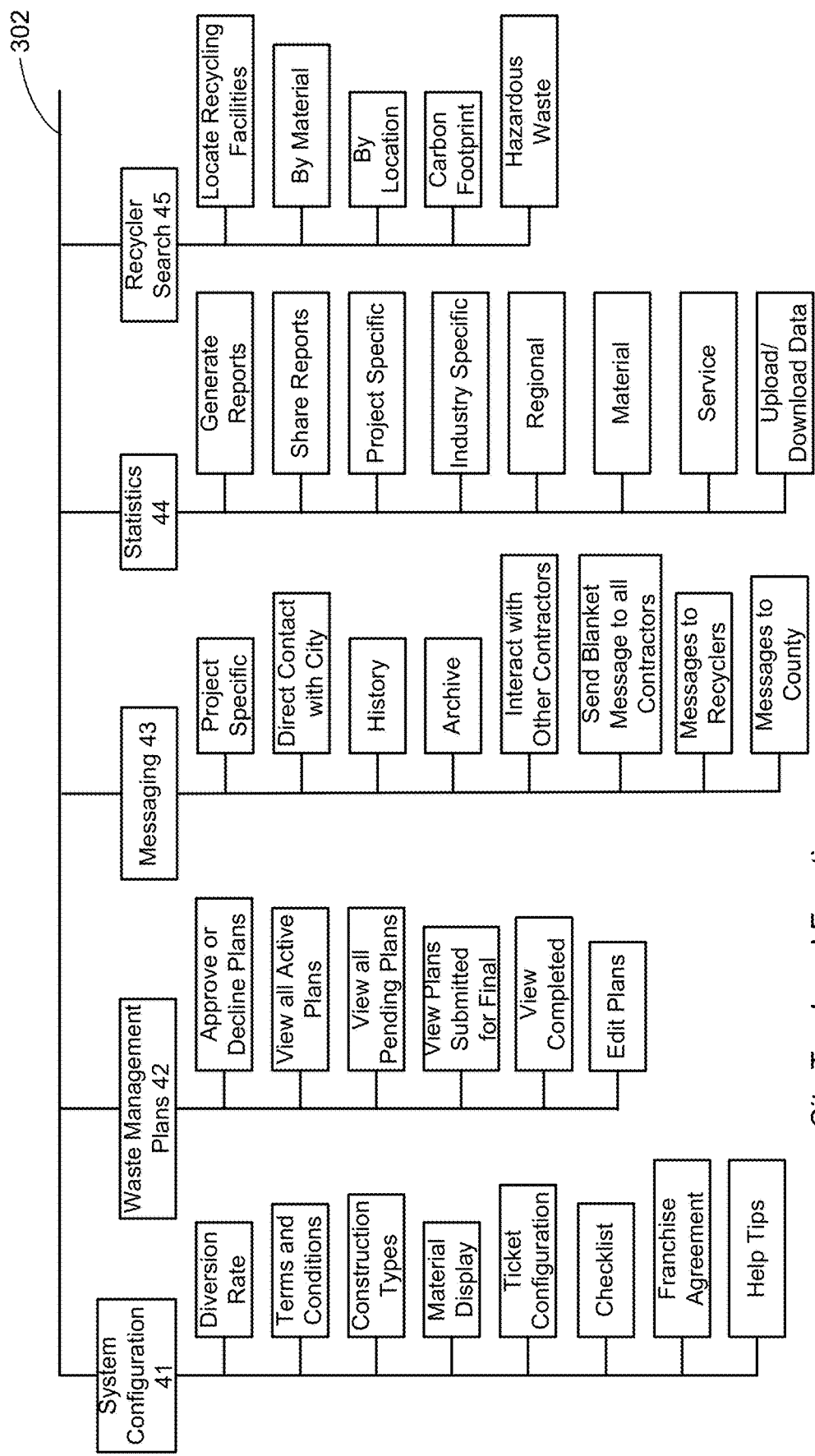
FIG. 17a-17b shows a high-level system model block diagram for the software for city users.
Figure 17B:
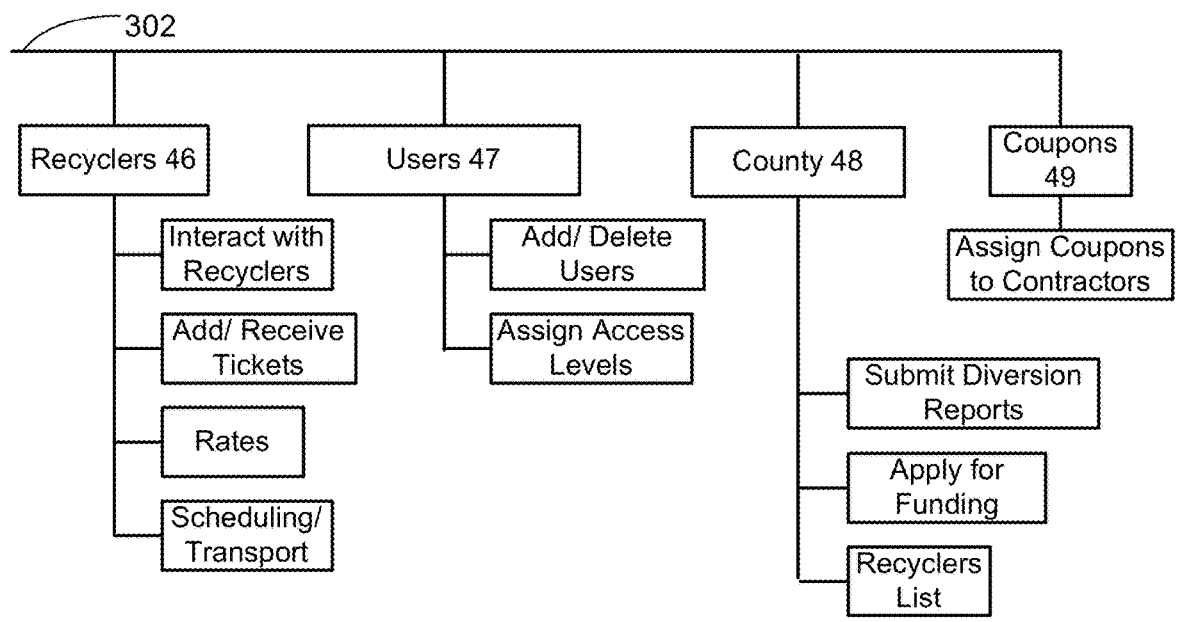

Government bodies are able to establish their ordinances and regulations, waste diversion guidelines, policies, terms and conditions interactively through the Web site of the present invention. The present invention allows cities and counties to easily provide and update their approved recyclers and haulers to the contractors. A system model block diagram for the top level functions, operations, and interactions of a city is shown in FIGS. 17a-17b. In this description it is assumed that cities are the government bodies which directly oversee waste diversion from projects within their jurisdiction. Of course, other government bodies could also have such jurisdiction, such as towns or counties, or even a state. FIG. 17a continues on FIG. 17b, at the location designated with reference number 302.

The top level groups of functions, operations, and interactions for a city include a system configuration group 41, waste management plan group 42, messaging group 43, statistics group 44, recycler search group 45, recycler group 46, user group 47, county group 48 and tracking number assignment group 49.

The system configuration group 41 includes provisions for setting up waste diversion programs for the city. The city sets the required diversion rates for the different materials in the diversion rate function. The particular terms and conditions for waste diversion programs are set up in the terms and condition function which also participates in the display of those terms and conditions during the waste diversion program application process.

The construction type function sets the different construction types under jurisdiction of the city's waste diversion program. The material display function sets the different materials which are to be reused or recycled. The ticket configuration sets the configuration for the tickets used for delivery to and acceptance of waste material at the recycling facilities. The checklist function ensures that all the requirements for a waste diversion program application are properly filled out before the application is submitted to the city. The franchise agreement promulgates the terms and conditions of an agreement for a recycling facility as an approved facility for the city.

The waste management plans group 42 include functions to approve or decline waste diversion project plans submitted to the city, to allow the city user to view all active project plans, to view all plans pending before the city, view plans submitted for final approval, to view plans for which the projects have been completed, to edit plans submitted.

The messaging group 43 allow direct contact with city official and includes functions to communicate with parties involved to a particular project, to communicate with the other contractors not associated with a particular project, to send blanket messages to all contractors, to communicate with all recyclers, to communicate with the county, to archive all messages including storing messages by project to provide a historical record of the same.

The statistics group 44 has a report generation function which can be specific by project, by industry, by region, by material recycled, reused, or disposed, and by services within the city's jurisdiction. To create the reports with statistical data, there is a data upload-download feature to move data stored with the city. The reports can also be shared. The recycler search group 45 has functions to find recycling facilities which can handle waste material in the city's jurisdiction by material, by project location, the "carbon footprint" of the recycling facility, and whether a facility can handle hazardous waste.

The recyclers group 46 incorporates interactions for monitoring the recyclers including the addition or receipt of tickets to monitor the transportation and delivery of waste materials from a project to a recycling facility, the scheduling and transport of the materials to the recycling facility and the rates charged by the facility. The user group 47 includes functions of adding or removing people who might have access to the stored and organized information on the contractor's projects; furthermore, the levels of access can also be set. The county group 48 includes functions for the city to submit its waste diversion reports to the county, to apply for funding from the county for the city's waste diversion programs and to provide a list of recycling facilities used by the city's waste diversion projects. Finally, the tracking number group 49 includes the function of assigning a tracking number to a waste diversion project upon the city's approval. The tracking number follows all activities and operations related to the project.

Figure 18:
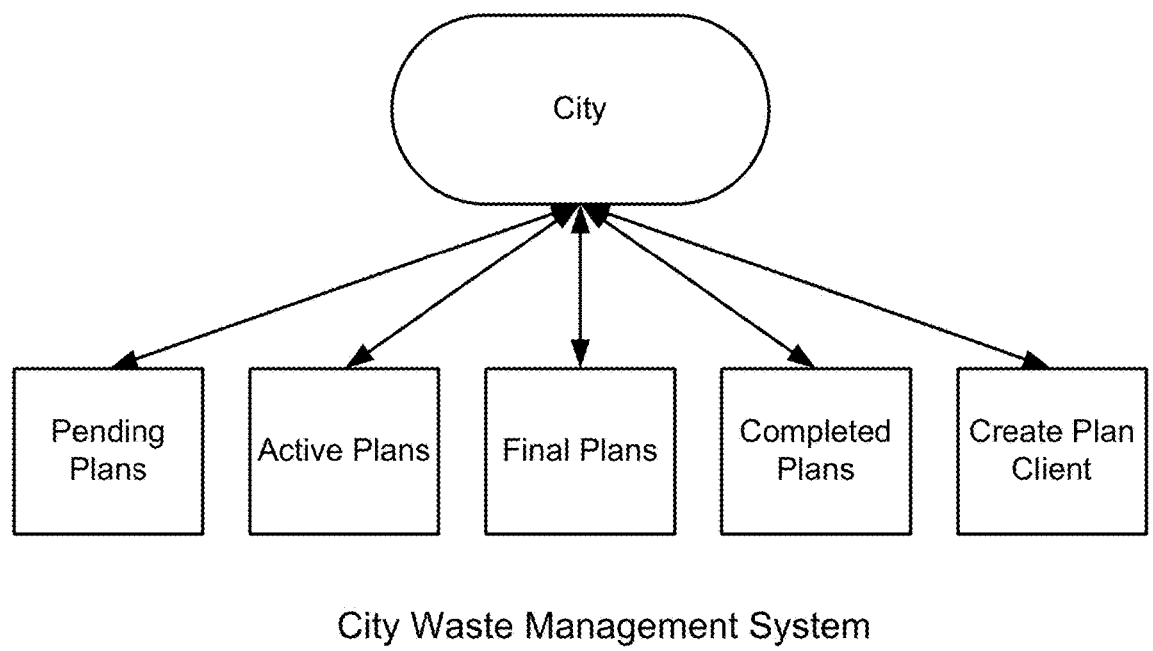
FIG. 18 shows a functional relationship for a city's home page and Web pages for different project plans submitted to the city, for creating a project plan can be created for a contractor through the city's home page.

As a result, FIG. 18 shows how a city user can move on the on-line system between a city's home page and Web pages for pending project plans, for active plans, for final plans, for completed plans and for creating a plan client, i.e., a function by which a project plan can be created for a contractor through the city's home page. This is convenient in case for a contractor who is already at "city hall" to enquire about a project within the city's jurisdiction.

Figure 19:
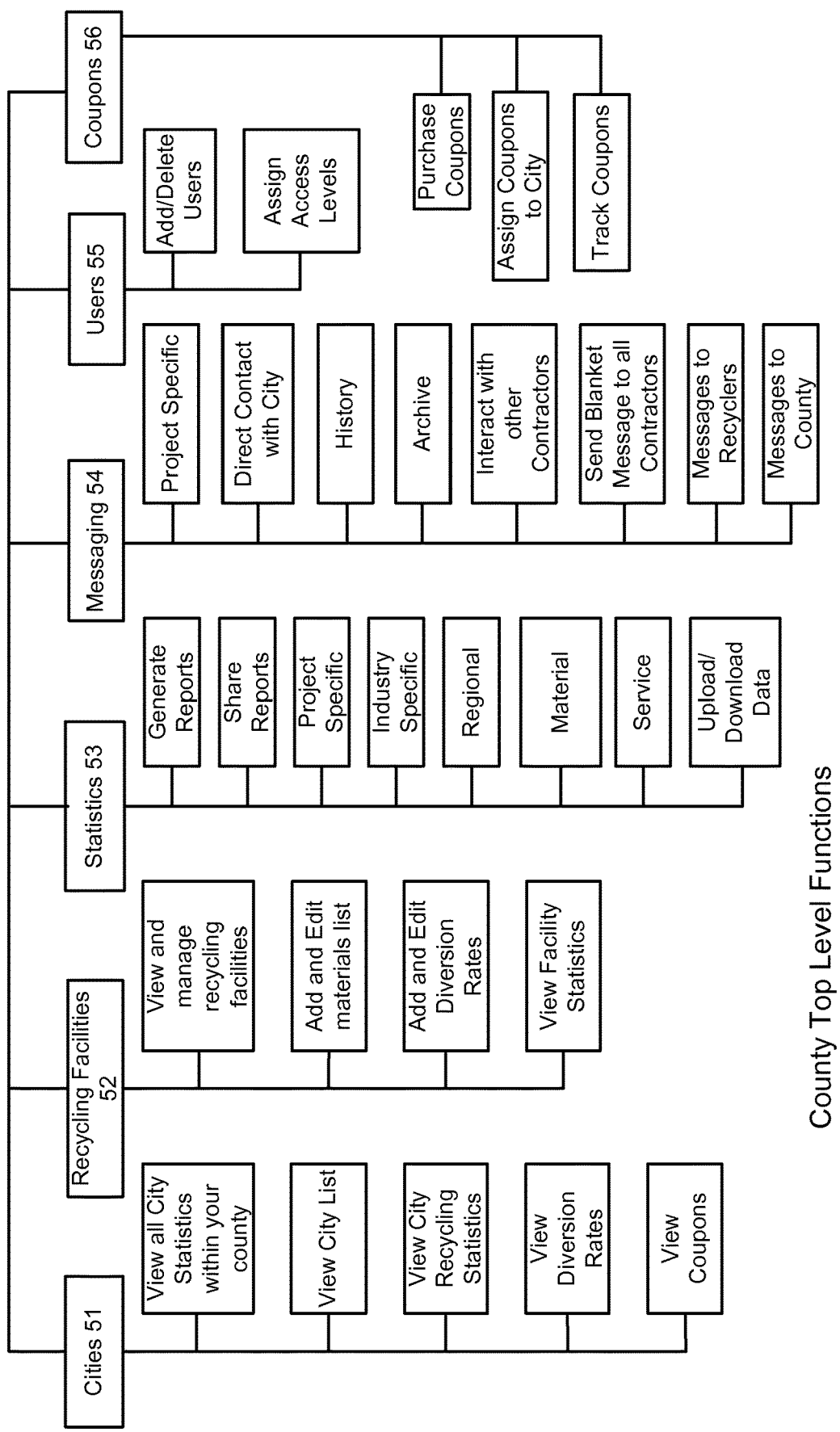
FIG. 19 shows a high-level system model block diagram for software for county users.

As previously described, there are likely to be many government bodies involved in the waste diversion process. In the present description it is assumed that cities have local jurisdiction over waste management projects and that counties have jurisdiction over the cities. FIG. 19 illustrates a system model block diagram for the top level group of functions, operations, and interactions for a county over the waste management programs of its cities with the present invention. The county's functions and interactions include a cities group 51, a recycling facilities group 52, a statistics group 53, a messaging group 54, a users group 55 and a tracking number group 56.

The cities group 51 includes functions for different views of waste management activities within the county: views of waste diversion statistics by all cities within the county, views of waste diversion statistics by each city within the county, views of each city's recycling statistics, views of waste diversion rates by city, year, material, etc., and views of all project tracking numbers issued by the cities within the county. The recycling facilities group 52 includes functions to view and manage the operations of the recycling facilities within the county. These management functions include the ability to add to and edit, e.g., further define, the materials which the facilities can accept, and the diversion rates for each type of material. The group 52 function allows views of statistics of the recycling facilities.

The statistics group 53 includes functions to generate reports for the county which can be specific by project, by industry, by region, by material recycled, reused or disposed, and by services utilized within the county's jurisdiction. To create the reports with statistical data, there is a data upload-download function to move data onto or off of county computers. This allows county personnel to access information even when not in front of a county computer.

There is also a function to allow the county to send messages to other users of the system. The messaging group 54 includes functions to allow direct contact with city officials and includes functions to communicate with parties involved to a particular project, to communicate with the other contractors not associated with a particular project, to send blanket messages to all contractors working on projects within the county, to communicate with the county's recyclers, to communicate with the county officials, to archive all messages including storing messages by project to provide a historical record of the same for the county.

The user group 55 includes functions of adding or removing people who might have access to the county's information; furthermore, the levels of access to the information can also be set. So, while some users in the county group can have unlimited access to information in the system, others will only have restricted access. Finally, the coupon group 56 includes the functions of allowing the county to purchase or acquire coupons to allow users access to the system of the present invention, to assign the coupons to its cities which in turn distributes the assigned coupons to its contractors and to track all the activities and operations related to the each coupon. Each coupon has a special access code for entry to the system.

System Model Block Diagrams for Recyclers

Figure 20A:
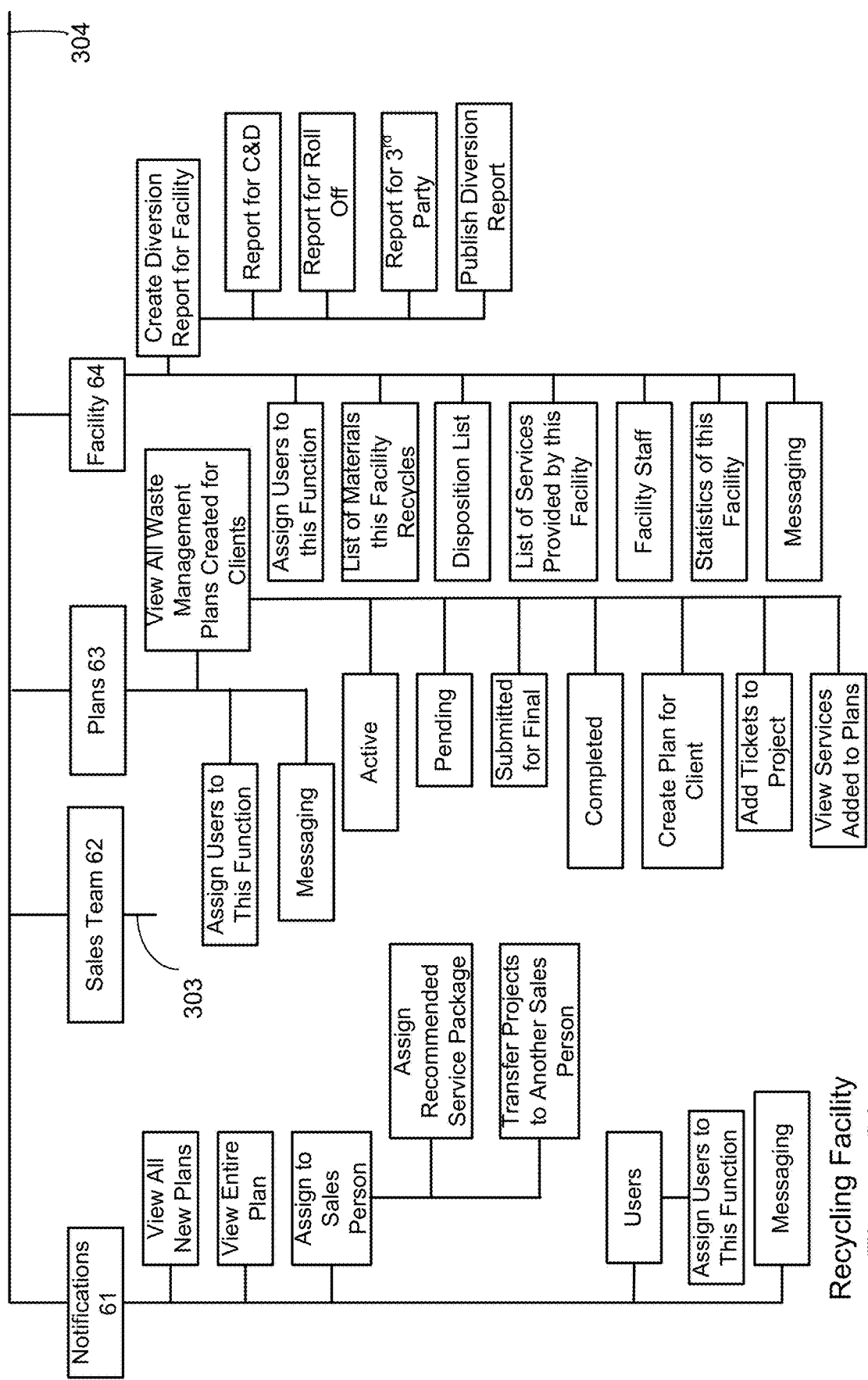
FIG. 20a-20c shows a high-level system model block diagram for the software for the recycler users.
Figure 20B:
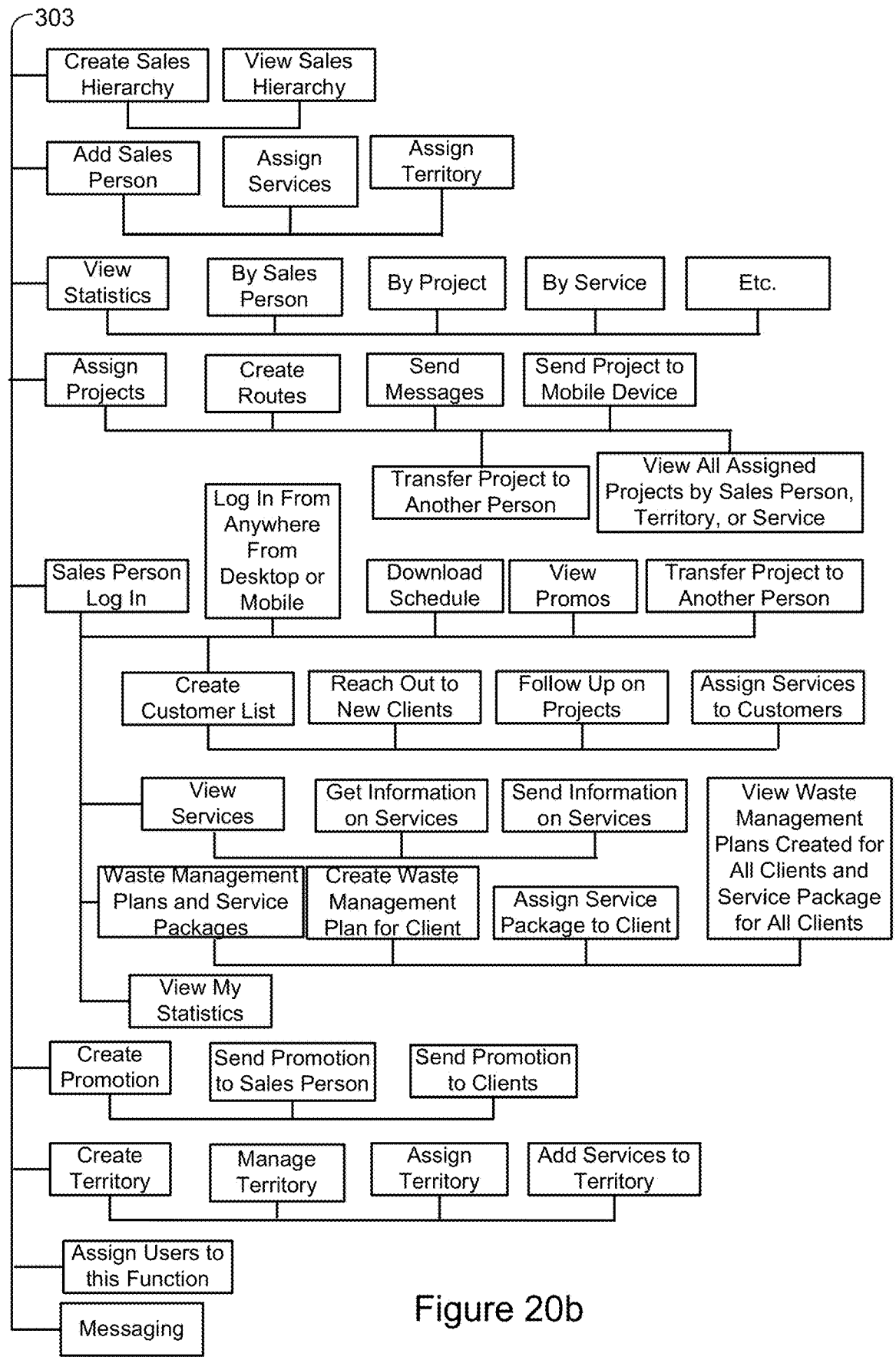
Figure 20C:
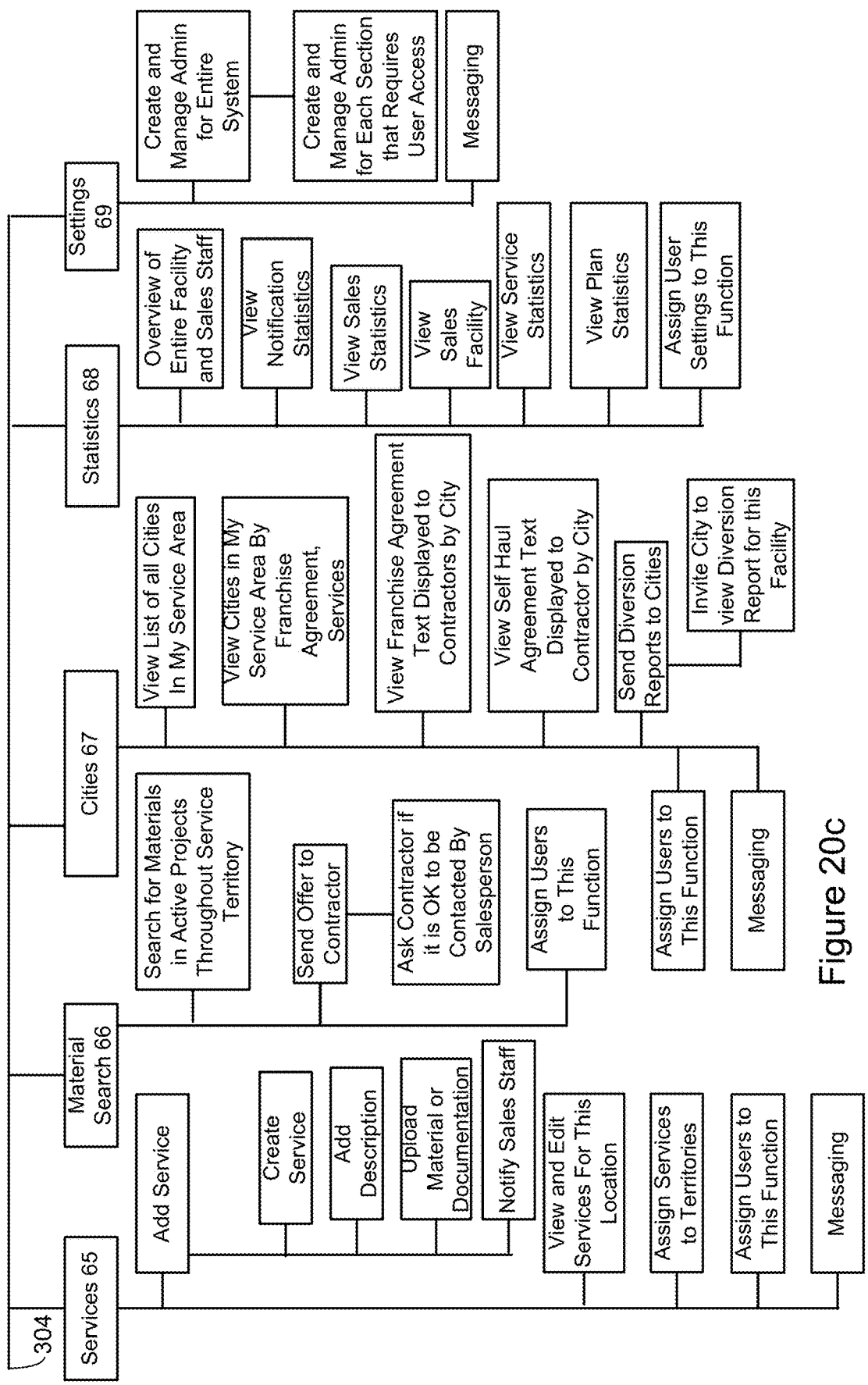

A recycler is typically a corporate or business entity which must sell the services of its recycling facilities, besides operating the facilities. The system of the present invention accounts for this. FIGS. 20*a*-20*c* shows a system model block diagram of top level functions and interactions for the recycler user which are organized into a notifications group 61, sales team group 62, plans group 63, facility group 64, services group 65, material search group 66, cities group 67, statistics group 68 and a settings group 69. FIG. 20*a* continues on FIGS. 20*b* and 20*c*, as designated with reference numbers 303 (connecting FIGS. 20*a* and 20*b*) and 304 (connecting FIGS. 20*a* and 20*c*).

The notifications group 61 includes functions for the recycler for a notification to view all newly filed waste diversion project plans, to view the details of the entire plans, to assign one or more recycler salespersons to projects for promote the recycler's facility or facilities with recommended recycling facility service packages, to reassign sales personnel to other projects, to assign recycler users for the notification function and for receiving notification messaging. The sales team group 62 includes the functions to create and view a sales hierarchy on-line, to add sales personnel with assigned territory and responsibility of services to sell, to allow sales statistics to be viewed by salesperson, by project, by service, and others.

The group 62 further includes the function to assign projects to sales members by creating routes, to send messages to sales members, to send the details of projects to a sales member's mobile device, to view all assigned projects by salesperson, by territory, by service, etc., and to change the project assignment to another person. For the salesperson, the group 62 has the function to allow the salesperson to log in whether from a desktop computer or a mobile device, such as a smart phone, to download a schedule for the salesperson, to create a customer list for the salesperson for new customers, customer follow-ups, and to assign services to facilities customers for a sale.

Under the group 62, there is also a function for a salesperson to view facilities services to learn more information about the services he or she is trying to sell and to send the information to a customer. The salesperson can also view waste management plans which had been created for all of the recycler's clients and service packages sold to the clients, create his own waste management plan for a customer or potential customer, and assign a service package to a customer. There is also a function which allows the logged-in salesperson to view the recycler's promotion videos and to view the salesperson's own statistics to judge performance.

The sales team group 62 has a function to create sales promotions and to send information about the created sales promotion to sales team members and to customers, actual and potential. There is also a function to administer the territories of the sales team members, including the creation of sales territory, the assignment of territories to sales members, the management of the sales territories, and the addition or modification of duties to sales members within territories.

The group 62 has an assignment function for adding or removing sales team users to and from access to the described sales team functions and interactions, and a messaging function to pass messages to the sales team and its customers, as described above. It should be noted that the present invention also allows linking to business sales Web sites, such as salesforce.com, for many of the described functions, interactions, and features.

The plans group 63 allows the users to view all waste management plans created for the customer of the recycler. The plans can be organized by whether the plans are for active projects, for projects which are pending, for submitted projects which await government final approval, and for completed projects. The plans group 63 allows plans to be created for a customer, to allow users to view services which have been added to a plan, and to add tickets to a project. The plans group 63 also has a function for the assignment of users who can access the functions of the group 63 and a messaging function to perform the necessary communications to carry out the described functions and interactions.

The facility group 64 includes a function to create waste diversion reports for each of the recycler's facilities. These reports include reports for construction and demolition (C&D) projects, reports for the number and use of roll off containers, reports for third parties and waste diversion reports for publication. The facility group 64 has a function to assign users for access to functions and interactions of the group, and functions which list the materials a facility recycles, how the materials received by a facility were disposed, the services available at the facility, the staff at the facility, and the facility recycling statistics. A messaging function to perform the necessary communications to carry out the described functions and interactions is also part of the facility group 64.

The material search group 65 includes functions to search for materials in active projects within the territory served by a facility, to communicate with a contractor about the sought for materials, including sending offers for the materials and requests for permission for a recycler salesperson to contact the contractor. The group 65 also has a function for the assignment of users who can access the functions of the group 65.

The cities group 67 has functions for the user to view all the cities in the service area of recycler's facility or facilities, to view all the cities in service area by franchise agreement with the recycler, to view all the cities in the service area by services rendered by the recycler's facility or facilities, and to view the text of any franchise agreement which a city shows to contractors or the text of any self-haul agreement which a city shows to contractors. The cities group 67 also includes functions to send the recycler facilities' diversion reports to any of the cities as part of a sales effort. Finally the group 67 includes a function for the assignment of users who can access the functions of the group 67 and a messaging function to perform the necessary communications to carry out the described functions and interactions.

The statistics group 68 includes functions to allow an overall view of the recycler's facilities or facilities and the sales team, to allow a view of the notification statistics, i.e., the statistics created by the functions and interactions resulting from the notification group 61, a view of the sales statistics, a view of facility statistics, a view of statistics of plans of projects within the service area of the facility or facilities. The group 68 includes a function for the assignment of users who can access the functions of the group.

Finally the settings group 69 has functions for the creation and management administration of the recycler's section, i.e., the administration and management of each recycler can be customized in accordance with its needs. This customization can be performed for each group which manages user access. A messaging function is also included to perform the necessary communications to carry out the described functions and interactions of the settings group 69.

Figure 21:
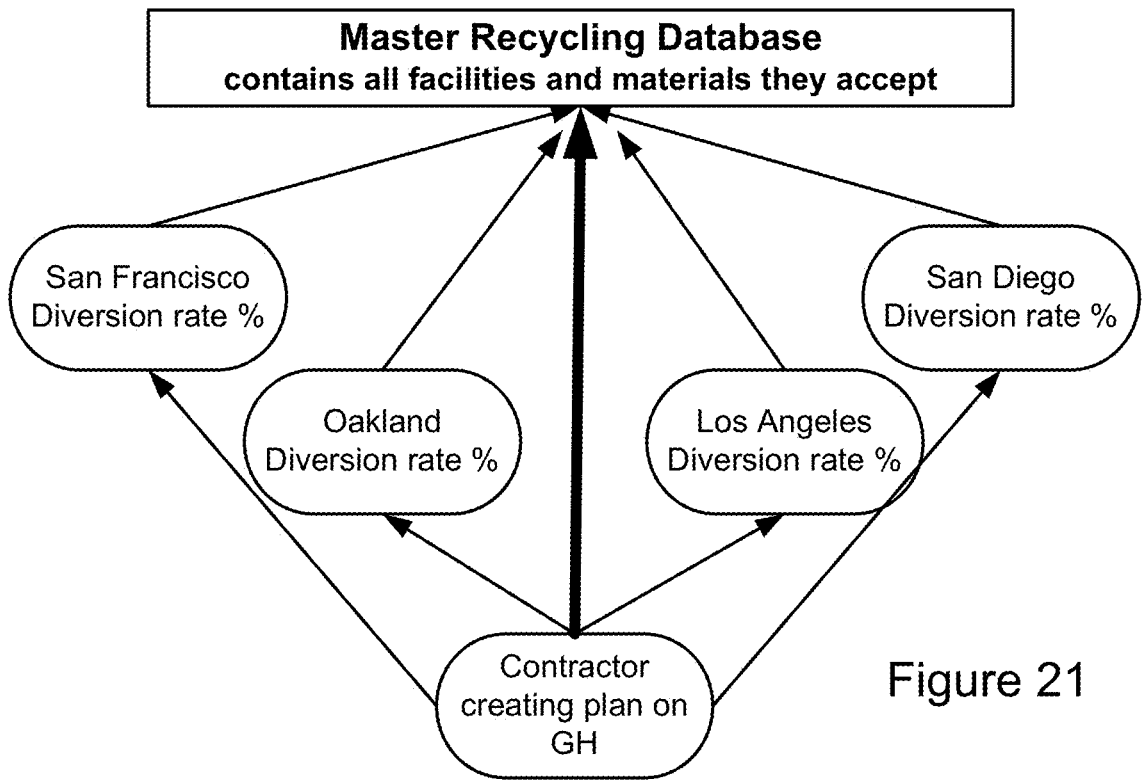
FIG. 21 is a representation of a master recycling facility database for the on-line system and the database-contractor interactions as a project plan is created on the on-line Web site.

FIG. 21 has a representation of a master recycling facility database which the on-line system uses and how the database interacts with a contractor as he or she creates a project plan on the on-line Web site. The database contains all the waste management facilities, locations and the materials which each facility accepts, among other data. In this example representation, the database permits the contractor to see the diversion rates of the waste management facilities in the California cities of San Francisco, Oakland, Los Angeles, and San Diego.

Figure 22:
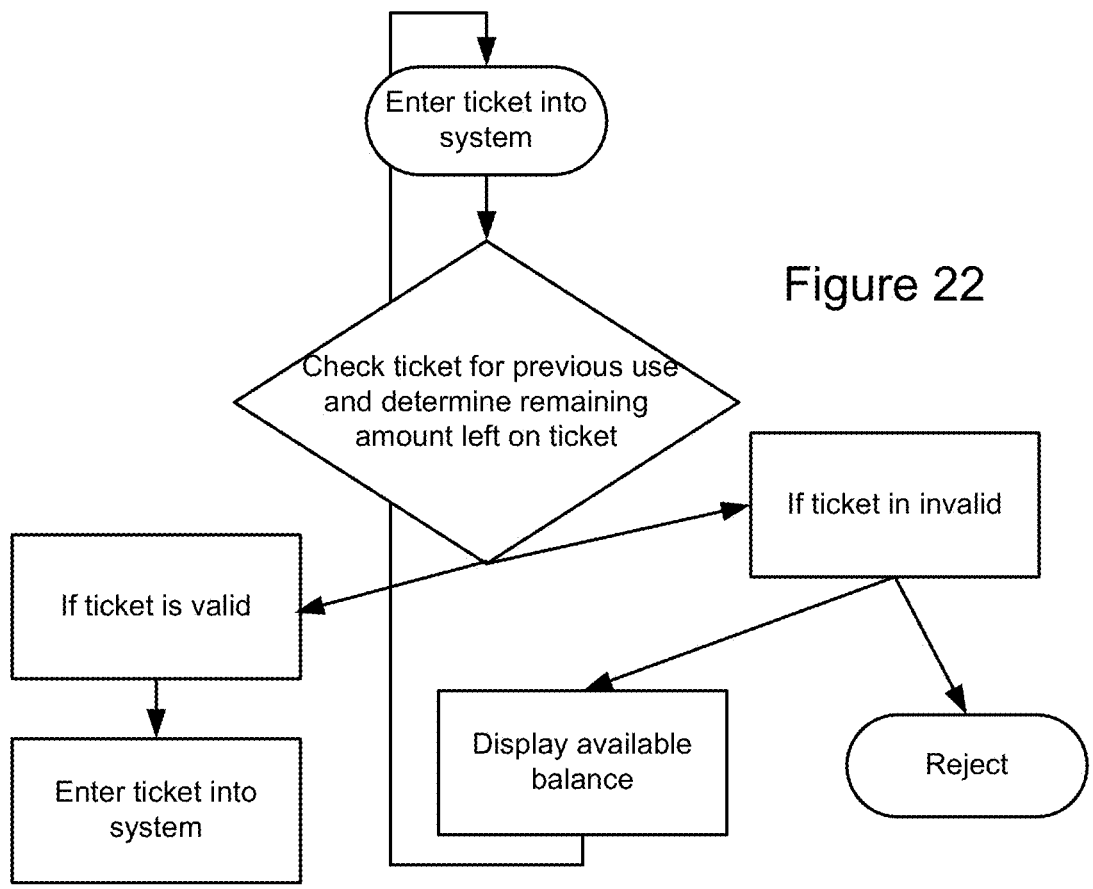
FIG. 22 illustrates the process flow for the on-line tracking of tickets for recycling material.

The system also allows the on-line tracking of tickets for recycling material. A process flow is shown in FIG. 22. Upon entry of a ticket into the system such as by scanning at the waste facility, the ticket is checked for previous use and whether there is associated a remaining material load amount (by load, cubic yard, or by tonnage) on the ticket. If the ticket is valid, the ticket is accepted into the system and the load is entered into the system. If the ticket is invalid, it is either rejected outright, or if the associated remaining material load amount is insufficient for the load amount being transported to the facility, the associated remaining load amount is displayed so that the reason for the rejection can be seen.

Figure 23:
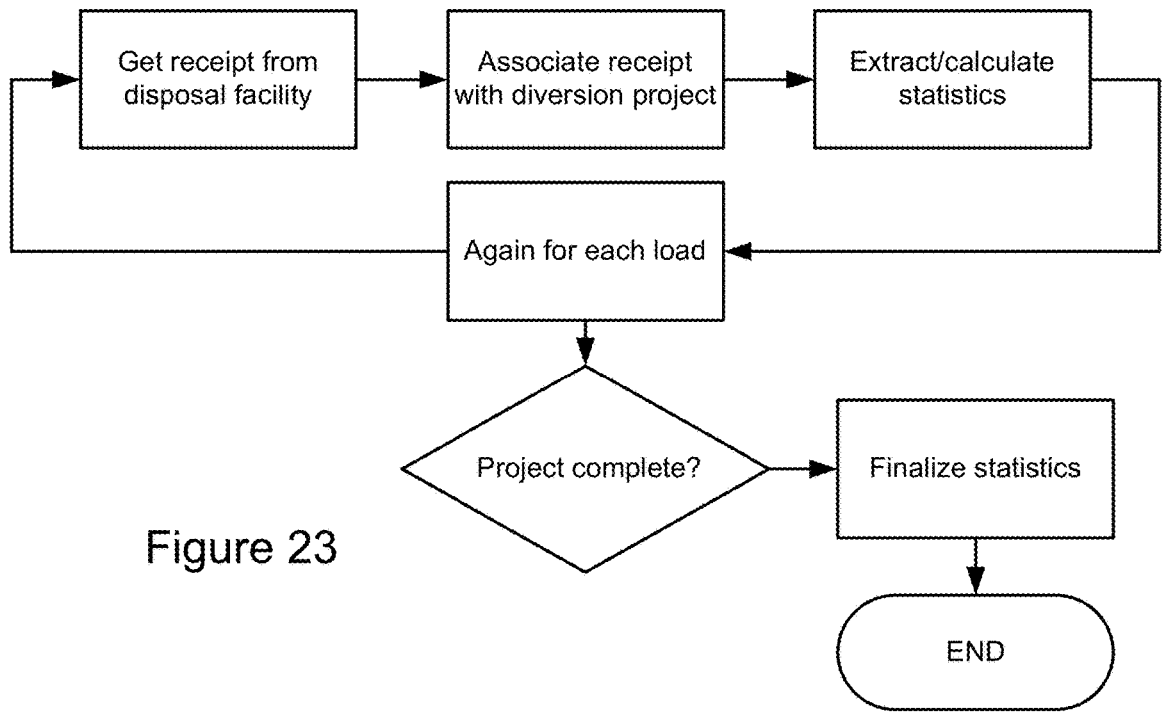
FIG. 23 shows the process flow for the creation of recycling statistics for the on-line system.
Figure 24:
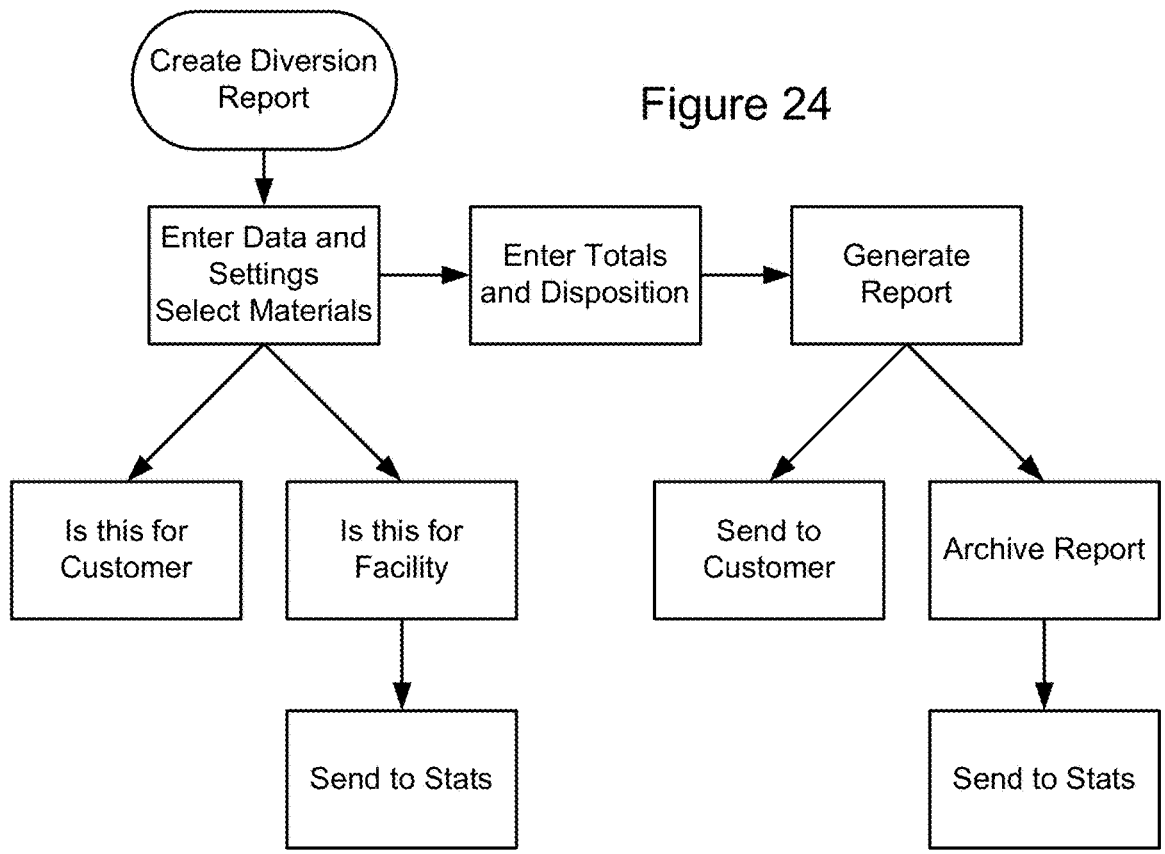
FIG. 24 shows the on-line process flow for the creation of waste management reports.

FIG. 23 shows a process flow for the creation of recycling statistics. For each material load accepted by the recycling facility, a receipt is obtained from the facility. The receipt is associated with the particular project, such as by project tracking number, and the data associated with the load is entered for statistics calculation. This is performed for each load until the project is completed. At that point the statistics are finalized for the project and the process flow ends. FIG. 24 shows the on-line process flow for the creation of waste diversion reports. As the data and settings for the materials are entered and gathered, the information is sent to the contractor and the waste facility as part of its statistics. The totals from the data and the disposition of the materials are used to generate a report to the contractor and for archiving and for the statistical functions of the city, county, and recycler users.

Property Managers or Owners

Figure 25:
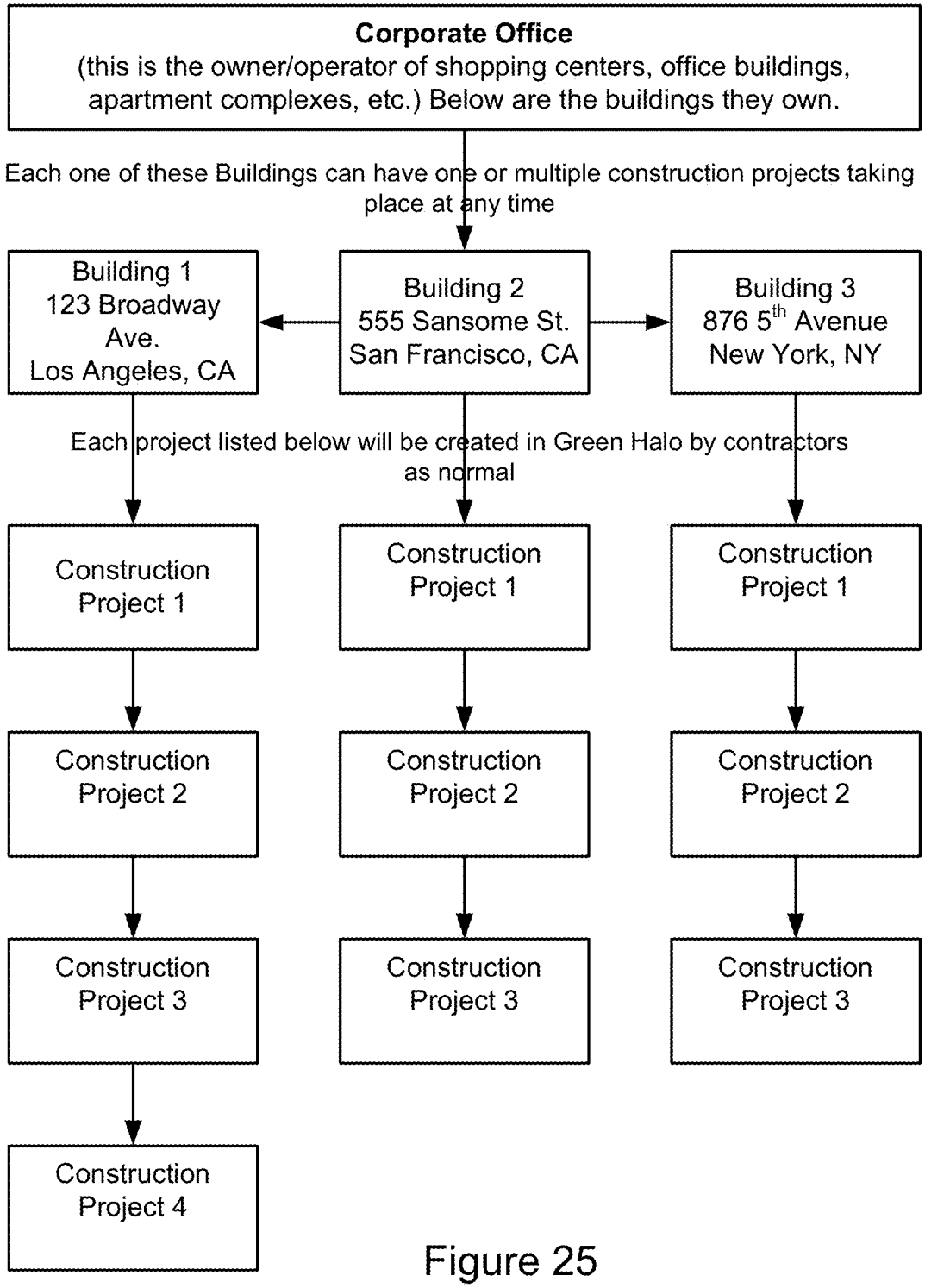
FIG. 25 illustrates the property manager or owner monitoring of properties with the on-line system.

The present invention also provides for managers and owners of properties to monitor the status of construction projects on their properties. FIG. 25 illustrates by block diagram how a property manager or owner can monitor its property or properties with the present invention. Both graphically and logically, a list of properties is placed under the properties' manager or owner and the current construction projects placed under the property associated with each construction project. In the illustrated example the manager or owner is shown as a corporate office and each of the properties as a building, one with a location in Los Angeles, Calif., the second in San Francisco, Calif. and the third in New York City. Building 1 is undergoing four separate construction projects, building 2 three projects and building 3 three projects. The manager or owner can easily find the status of each project and monitor its progress.

Figure 26:
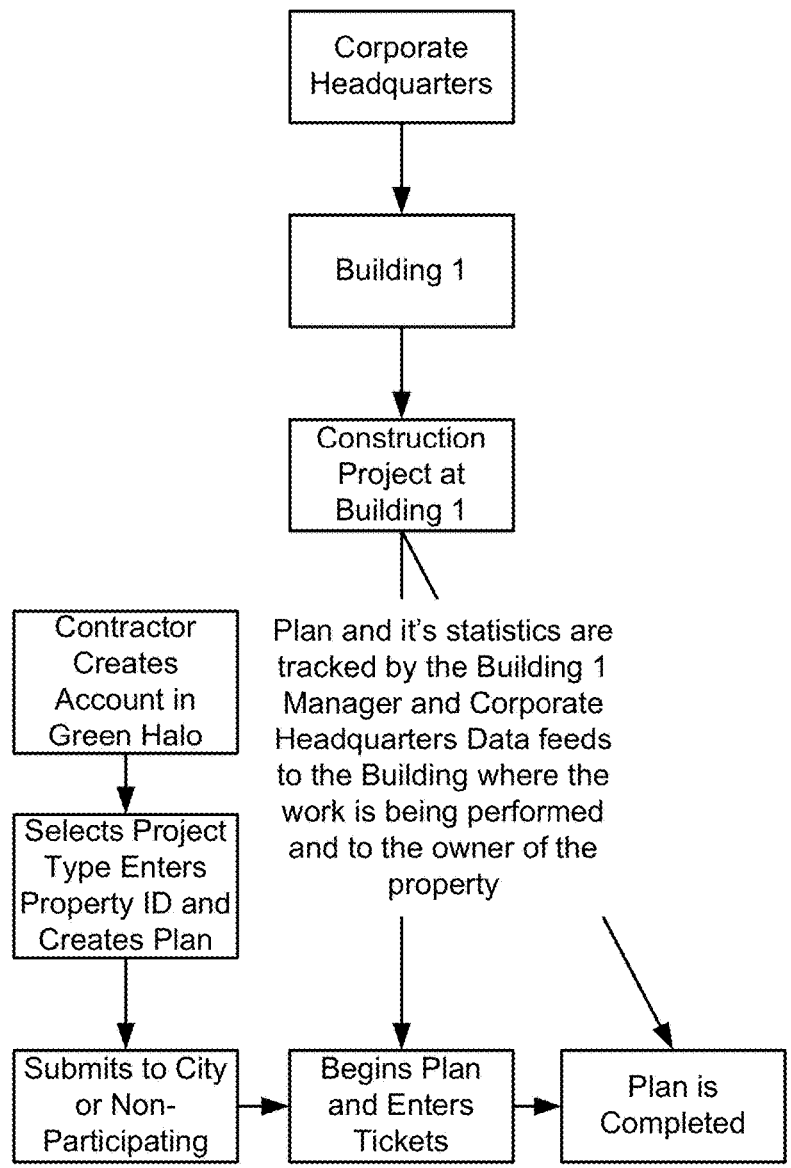
FIG. 26 illustrates a process flow by a property owner or manager tracks a project after it is registered on the on-line system.

FIG. 26 is a representation of a process flow of how property owner or manager tracks a project through the described on-line system. In this example, the property owner or manager (corporate headquarters) is interested in following a construction project at building 1. The contractor for the project creates an account with the on-line system (Green Halo in this example), enters the necessary project plan information, e.g., project type, property identification, etc. for a plan to submit to the government body having jurisdiction over the construction project. The plan is started on-line and the tickets are entered. At this point the property owner or manager can track the progress and the resulting statistics of the construction project at building 1 on-line until the plan is completed.

Figure 27:
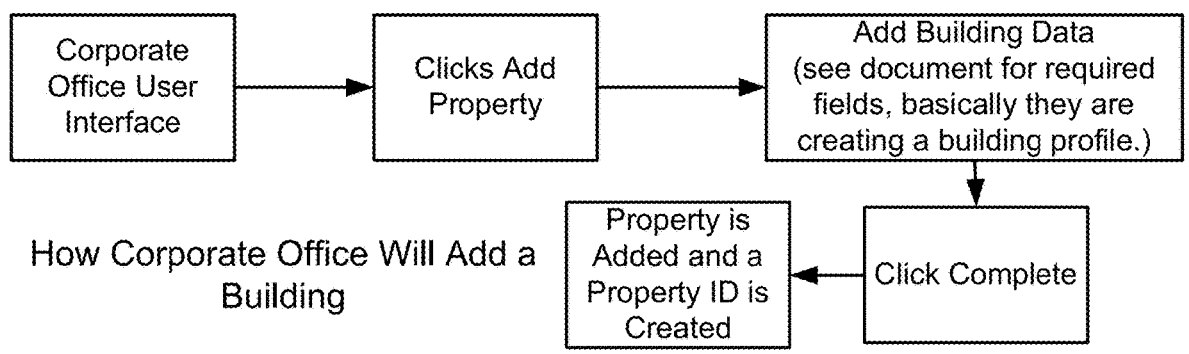
FIG. 27 shows the process flow by which a property owner or manager adds a property for tracking with the on-line system.

FIG. 27 illustrates a process flow of how a property owner or manager adds a property for tracking with the described on-line system. Through the owner or manager's home page an add property function is invoked. The owner or manager is prompted to insert building data for the property so that a profile of the property is created. After the necessary information is submitted, an identification for the property has been created and the property is added to the list of properties which the owner or manager can track.

Sign-Up and Login Procedures

Figure 28:
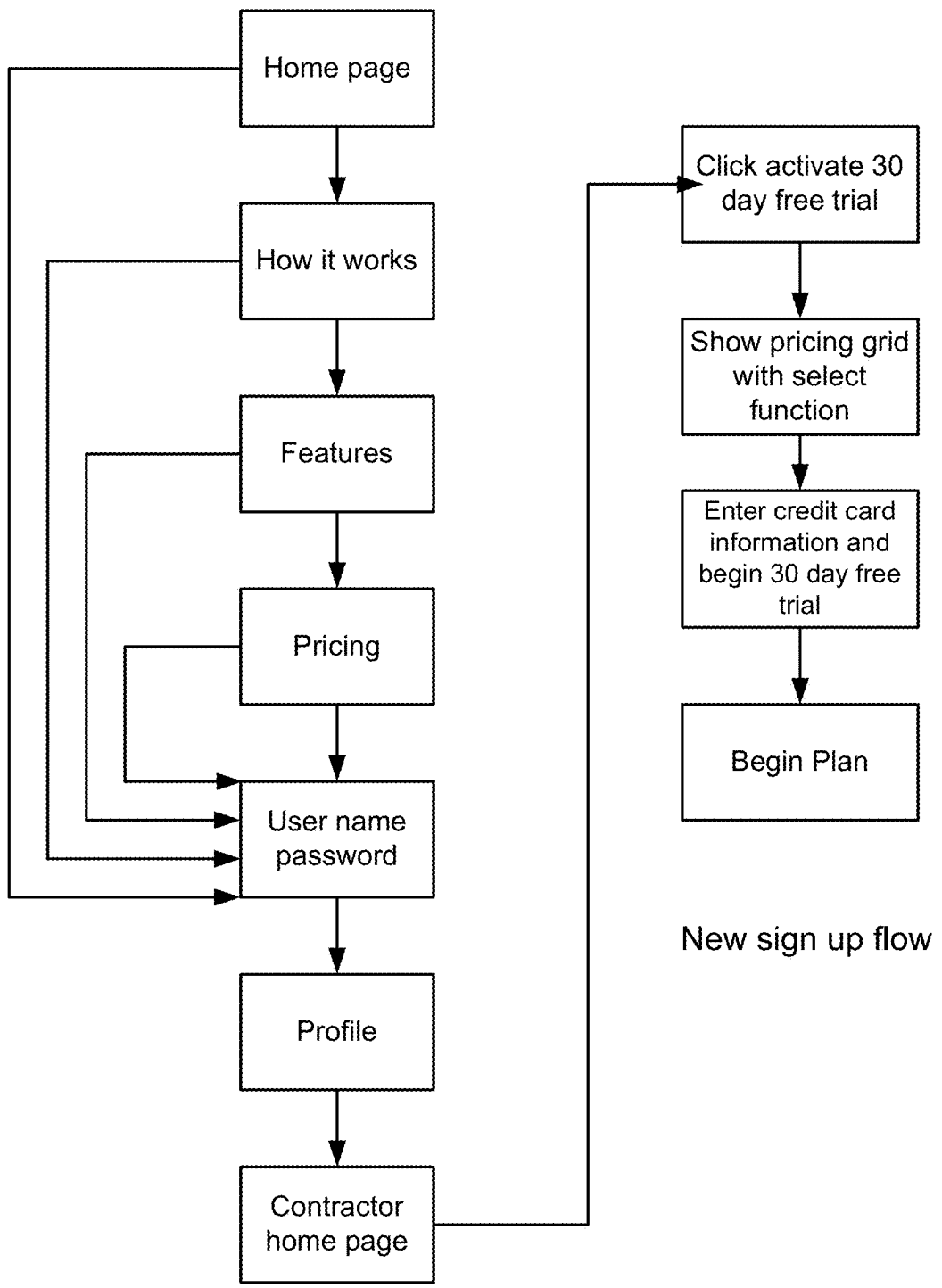
FIG. 28 is a representation of a process flow for the initial sign up of a contractor user to the on-line system.

The described Web site has different sign up process flows for different types of users. The initial sign up of a contractor, for example, is shown in FIG. 28. The prospective user visits the Web site's home page and views information on the on-line waste management system, its features, and pricing. Alternatively, these pages may be skipped. The Web site then invites the prospective user to enter a user name and a password, then to enter user profile information. From the profile information, a homepage for the contractor is created on the Web site and the user is directed to the user's homepage. The user is sometimes offered a free trail period (30 days in this example) and then the user is shown a pricing grid of a select function, an example of which is shown in FIG. 29. Once the contractor enters credit card information, he can begin the free trial period (if offered). The contractor is now registered with the Web site.

For example, in an implementation, a user is charged a monthly subscription fee for using the system according to the pricing model as shown in FIG. 29. The pricing model is based on a $20 setup fee, a $20 monthly fee for each active plan, and a $9.95 monthly membership fee. In the figure, the subscriber has six projects in 2009, which start and end at various times of the year.

As an example, project one is identified as Smith at a site, 555 Broadway Street in San Francisco. The project start date is Jan. 11, 2009 and ends on May 15, 2009. The duration of the project is 89 working days or business days, which does not include weekends or holidays. The following is a summary of subscriptions fees, broken down by month:

January. The total subscription fee for this month is $40 for one set up fee ($20), one monthly fee for active plans ($20), and zero monthly membership fees ($0). Project one starts this month.

February. The total subscription fee for this month is $20 for zero set up fee ($0), one monthly fee for active plans ($20), and zero monthly membership fees ($0). Project one continues this month.

March. The total subscription fee for this month is $60 for one set up fee ($20), two monthly fee for active plans ($40), and zero monthly membership fees ($0). Project two starts this month and project one continues.

April. The total subscription fee for this month is $120 for two set up fee ($40), four monthly fee for active plans ($80), and zero monthly membership fees ($0). Projects three and four start this month and projects one and two continues.

May. The total subscription fee for this month is $129.95 for one set up fee ($20), five monthly fee for active plans ($100), and one monthly membership fees ($9.95). Project five starts this month, projects two, three and four continues, and project one ends.

June. The total subscription fee for this month is $89.95 for zero set up fee ($0), four monthly fee for active plans ($80), and one monthly membership fees ($9.95). Projects two, three, four and five continue.

July. The total subscription fee for this month is $129.95 for one set up fee ($20), five monthly fee for active plans ($100), and one monthly membership fees ($9.95). Project six starts this month, and projects two, three, four and five continue.

August. The total subscription fee for this month is $109.95 for zero set up fee ($0), five monthly fee for active plans ($100), and one monthly membership fees ($9.95). Project two ends and projects three, four, five, and six continue.

September. The total subscription fee for this month is $89.95 for zero set up fee ($0), four monthly fee for active plans ($80), and one monthly membership fees ($9.95). Projects three, four, five and six continue.

October. The total subscription fee for this month is $89.95 for zero set up fee ($0), four monthly fee for active plans ($80), and one monthly membership fees ($9.95). Projects three, four, and six continue and project five ends.

November. The total subscription fee for this month is $69.95 for zero set up fee ($0), three monthly fee for active plans ($60), and one monthly membership fees ($9.95). Projects four and six continue, and project three ends.

December. The total subscription fee for this month is $49.95 for zero set up fee ($0), two monthly fee for active plans ($40), and one monthly membership fees ($9.95). Project six continue, and project four ends.

In an implementation, a monthly membership begins when a first project of a user ends. For example, this can be a fee for allowing the user access to the system to access and retrieve information from previously completed projects. The monthly membership fee applies per user, so additional projects that are completed do not incur the monthly membership fee. In another implementation, a monthly membership fee applies every month a user is subscribed to the system, from the initial enrollment of the user to the system. The monthly membership fee can be zero.

Figure 30:
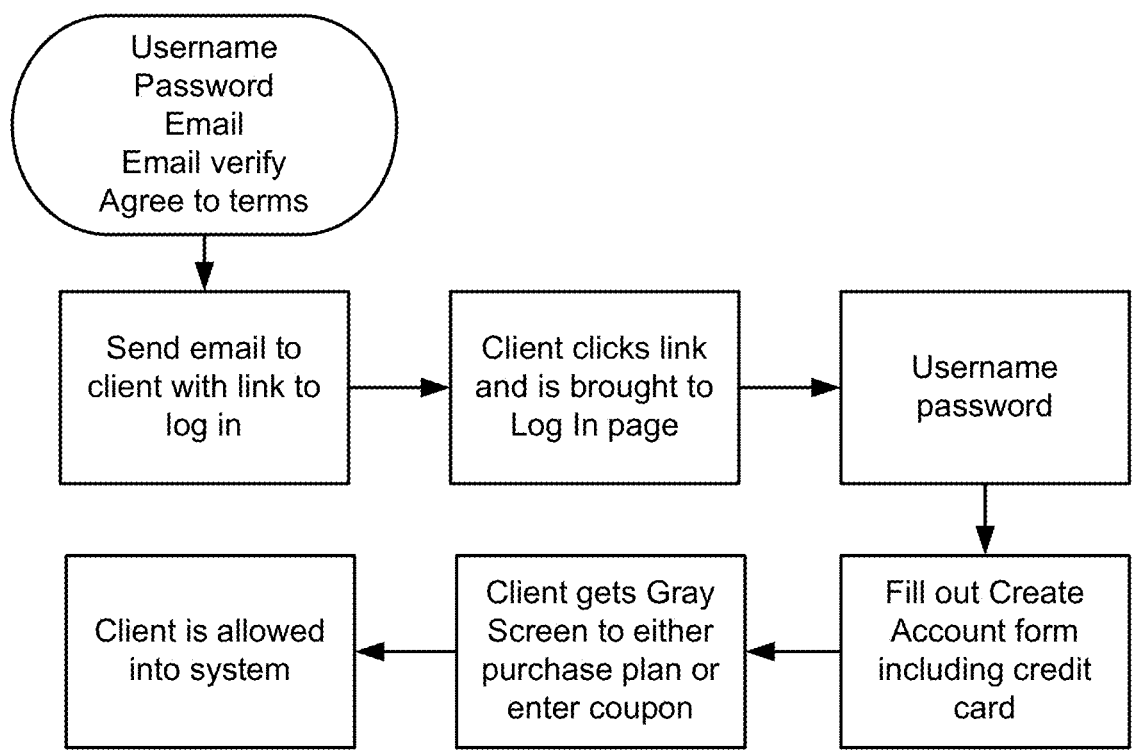
FIG. 30 is a representation of a process flow for the initial sign up of another user to the on-line system.

Another a user may initially register with the Web site is illustrated by the process flow in FIG. 30. The prospective user first enters a username, password, and e-mail address, verifies the e-mail address and agrees to the Web site operator's terms. The operator then sends an e-mail to the user with a link to log in. The user then clicks the link and is brought to a Log In page in which the user enters the user's password. The user then fills out a Create Account form which includes credit card information. A screen is presented to the user (e.g., a gray screen) to either a purchase plan or a coupon entry form, which allows the user to select a plan to pay for access to the Web site and its benefits or to pay by coupon. The coupons have special access codes and are created and distributed by the operator to encourage potential users, such as contractors, to use the Web site. Then the user is allowed access into the system.

Figure 31:
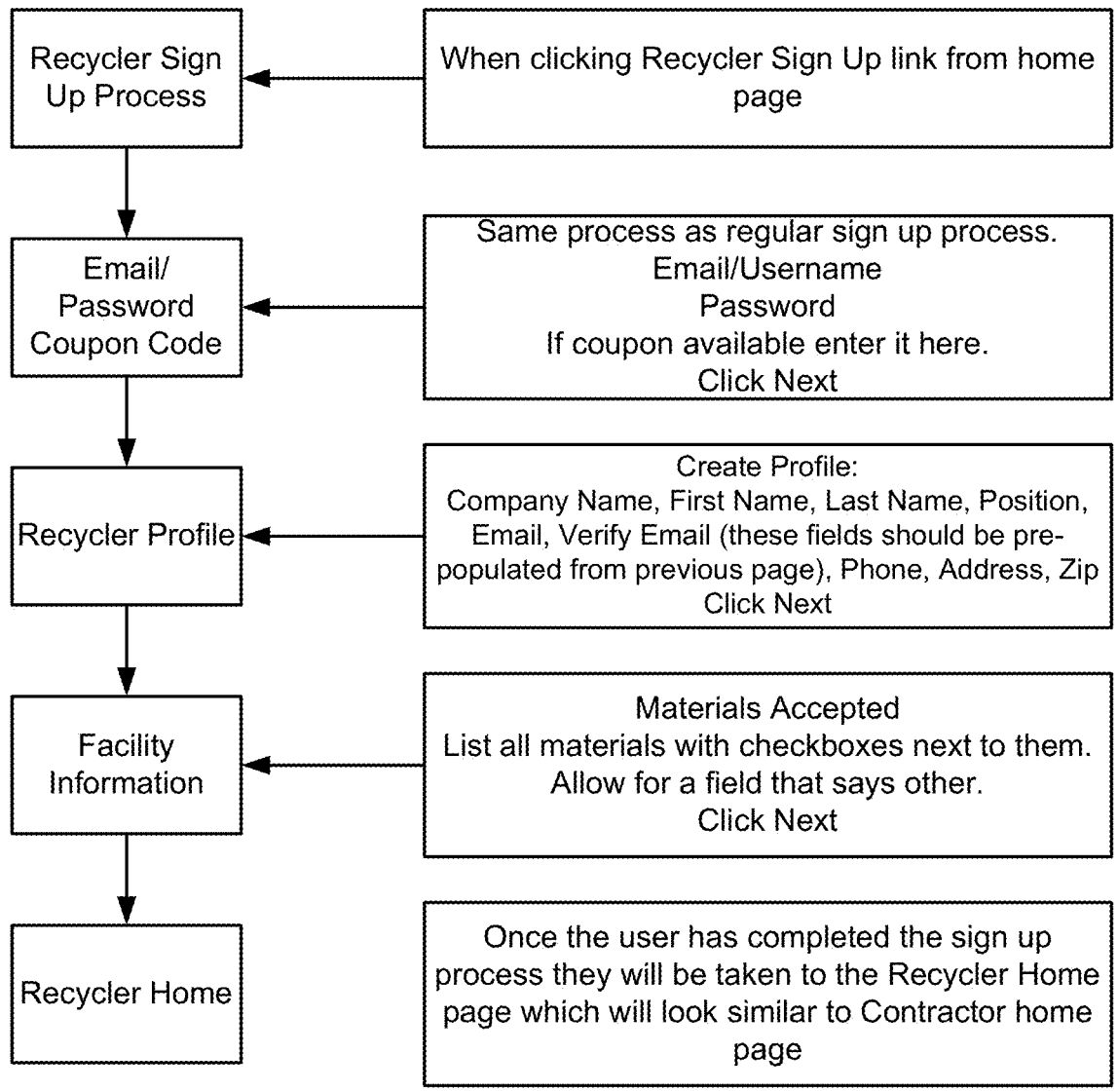
FIG. 31 is a presentation of the process flow for sign up of a recycler user.

FIG. 31 illustrates how a recycler can sign up with the on-line system. Through the Web site homepage, the recycler enters a Recycler Sign Up link. As in the case above, the recycler enters a user name, password, e-mail address, and a coupon code if a coupon is available. After submitting the information, the user receives a Web page to enter information, such as company name, name of recycler user person, user's position at the recycler, e-mail address, which is verified, telephone, address, and zip code, to create a recycler profile. To the extent that any data field can be prepopulated by existing information, it is so done to speed the sign up process. After the recycler profile information is submitted, waste facility information, such as the materials accepted by the facility, is solicited. The recycler can add materials which it accepts beyond the standard list of accepted materials. After the facility information is submitted, the recycler sign up process is complete and the recycler is directed to its own newly created homepage.

In an implementation, the system is an on-line paperless waste management system that allows contractors to create waste management plans, allows cities and other governing bodies to manage and enforce their recycling policies, allows property owner to track the recycling on construction debris within their property and allow recycling facilities to create diversion reports and upload tickets directly to user's projects all on-line.

For the contractor: The system has an on-line mechanism that allows contractors and other users to create waste management plans, maximize their recycling efforts, reduce their project's carbon footprint emissions, track the recycling of their project and determine the project's diversion rate in real time and convert their final reports to formats suitable for LEED, CalGreen, and other recycling requirements.

The CALGreen Code is part 11 of the California Building Standards Code in title 24 of the California Code of Regulations. The full name of part 11 is the California Green Building Standards Code, but in short it is known as the CALGreen Code, or just CALGreen. CALGreen is incorporated by reference. The 2010 edition of the CALGreen Code became effective throughout California on Jan. 1, 2011.

The contractor function specifically allows a contractor to create a waste management plan on-line and submit it to the city or other governing body via the Web. Based on the data the contractor or user has entered into the system, the system calculates the project's diversion rate and displays the diversion rate of the project along with suggestions on how to maximize the project's recycling and diversion efforts. When describing or entering a plan, the contractor enters a zip code or address of the project site, which reveals the appropriate city or other regulations that are in effect at the project site.

The system locates the nearest recycling facilities (participating and not participating in system) to the user's project and displays those facilities to the contractor. The search for the recycling facility can be by city, zip code, or address, or a combination of these. The system calculates what recycling facilities will result in the least amount of carbon footprint impact and maximum diversion, and displays them for the user to choose from.

In an implementation, the system calculates the carbon emissions when for a particular recycler by calculating a driving distance between the project site and recycler. Other parameters entered by the user (such as size of a load, truck used, and other related information) are used to calculate carbon emission of moving the recycling load from the project site to the recycler. The system can display the carbon emissions for using different recyclers at different locations. At the end of the project, the system can report the total carbon emissions or carbon footprint used to perform recycling for this particular project. The carbon emissions information can be reported to governmental agencies and groups that track these statistics.

Some cities may have franchise agreements with certain recyclers, so that contractors who work in that city must use a particular recycler in the franchise agreement. The system tracks franchise agreements (as entered in and specified by the city), so that when a franchise agreement is in effect, only those recyclers that have a franchise agreement with the city will appear. The franchise agreements can be associated with a city or zip code, and can be tied with a system project tracking number (e.g., Green Halo tracking number that is assigned to track each project).

The system then assembles this data into an organized on-line format that is exportable to several formats and functions, including paperless on-line sharing, PDF, printable view, and other popular formats. By organizing this data in this fashion the system can also convert the data and prepopulate LEED, CalGreen, and other recycling governing body forms.

The system allows the user to visually see on their screen the total recycling, salvage, and disposal volume of a project along with the diversion rate of the project in real time. The system identifies what projects are in compliance with local jurisdictions and governing body's requirements and displays the data in color coded formats for the contractor to visually see which projects are in compliance or not, allowing the contractor to adjust the recycling efforts of the project in real time.

The system allows for users inside and outside the system to upload recycling tickets and information on-line or via mobile devices (e.g., picture taken using a smartphone). A ticket entry can be specified in the system by a ticket number and recycling facility.

The system has an internal messaging system that allows all integrated components and users, to communicate on a project without using an outside e-mail provider, eliminating possibility of messages between user being lost or undeliverable via e-mail. The system records and tracks all conversations and displays them as record for each project. In an implementation, internal messages are tied to a system project tracking number (e.g., Green Halo tracking number that is assigned to track each project).

The system provides aggregation reporting for users that allow the users to track and analyze data by a wide variety of characteristics. For example, government authorities and contractors can track material diverted by type of material, building type, project type, hauling type and by diversion location.

The system issues a unique tracking number to for waste management plans created by users and allows for property owners to create unique tracking numbers for their properties. The combination of which allows property owners and other asset management entities the ability to track the recycling activities of contractor performing work within their property and their portfolio in real time anywhere around the world.

The system has developed a paperless on-line mechanism that allows contractors to visually see the uploaded scanned recycling tickets and other recycling data via the system. This allows contractors and user to verify that the recycling ticket matches the data entered and provide proof of recycling.

For governing bodies: The system provides an on-line paperless system that allows cities, and other governing bodies to customize their recycling programs and enforce and police waste ordinances. The governing body can customize the disposition of a material to meet the governing body's recycling requirements and set the method in which it wants that material handled.

The governing body can manage its list of recycling facilities and view the diversion rate, equipment list, processing method, and facility report to determine whether or not that facility qualifies for the governing body's requirements. The governing body can then decide to add or delete this facility from its list. This customized list is viewable to the contractor or user when submitting a waste management plan in the governing body's jurisdiction.

The governing body can set its diversion rate requirements and the diversion rate requirements up or down at any time. These are user configurable by the governing body user. The system recognizes and time stamps what projects must meet what requirements for the period in which they were created.

The system allows for governing bodies to upload their recycling requirements and conditions. Once uploaded the contractor or user of the system will be displayed this information and will be required to abide by these requirements by signifying that they agree to the terms and conditions on-line, which allows for the on-line verification that users agree to the terms, allowing the governing body to verify that the user has acknowledged the receipt of these conditions and will abide by these conditions.

The system allows for a governing body to enforce and police its waste hauler's franchise agreement. The activation of this function allows for the governing body to manage the franchise requirements and self-haul guidelines that the contractor or user of the system will need to comply with. This function is triggered by the selection of materials identified by the governing body as "triggering materials," and by the selection of the hauling method selected by the user. The system will then recognize that selection or combination of selections to determine whether or not a particular waste management plan will need to comply with these franchise requirements set forth by the governing body and will display the appropriate information the user will need to agree to complete their waste management plan. This function also serves notice to the governing, contractor or user of the system, recycling facility and or any other person or entity identified as being required by the governing body as requiring notification.

The system allows governing bodies to manage and customize the disposition method of materials. The selection of the disposition method for a particular material will trigger the recycling, salvage or disposal options of a particular material and will influence the decision making capabilities of the contractor or user of the system based on the governing body's recommendation or requirements.

The system allows for the recording and display of statistical information generated by contractors or users within the governing body's jurisdiction by material type, facility type, project type, building type, hauling type and other types generated by the system and the governing body's selection and additions.

The system allows for the governing body to select from a prepopulated list of building types, project types and or construction types, which the governing body can select from or customized by the governing body that will be displayed to the user for the purposes of identifying their project types. The system records this data for the governing body to view data in real time as entered by the user.

The system provides a customizable checklist mechanism that prevents a waste management plan from being finalized by the governing body or anyone using the system without checking off the list of items the governing body has deemed as required prior to finalizing a waste management plan.

The system provides an on-line paperless mechanism that allows for a governing body to issue an access code a user for the purposes of creating a waste management plan. This mechanism recognizes the governing body that issued the access code and preloads the settings the governing body has selected for creating a waste management plan in its jurisdiction. The mechanism does not allow for the user that was issued the code to use the access code in another jurisdiction and can be identified as specific to a particular project. The system displays to the governing body all access codes issued, redeemed and in use or not at all times.

The system provides an on-line paperless system to allow governing bodies the ability to edit waste management plan information and add multiple permits and other certification to a project. The system also automatically recognizes the city or jurisdiction the waste management plan is being created in and loads the proper city and county information avoiding incorrect entries by users. The system also preload the diversion requirements based on this data.

The system provides an on-line paperless system that allows for governing bodies to set different diversion requirements for different types of projects and materials. The governing body can customize criteria for waste management plans and recycling requirements based on project type, building type, construction type, material type and others. Based on the these settings the user will be displayed the options available to them to meet the requirement of the governing body's jurisdiction, and help "funnel" the user to maximizing diversion.

The system provides a list of twenty-four (24) construction material descriptions. These materials and their descriptions and identification have become the standard in the industry. These categories materials include: appliances and equipment; asphalt; bricks, masonry, and stone products; cardboard; carpet padding or foam; ceiling tiles; concrete; deconstructed and salvage items; dirt, clean fill; drums, barrels, and buckets; drywall, demo and painted; glass plate or tempered; green waste, yard and landscape; hazardous waste and materials (e.g., asbestos, contaminated soils, railroad ties, chemicals, pesticides, paint, and explosives); metal; mixed C and D (e.g., construction materials that are not source separated but can be recycled); plastics; porcelain; rock, sand, gravel, and other inerts; roofing asphalt; trash; wood, clean; and wood, treated and painted.

The system allows governing bodies to create custom lists of materials and their dispositions to create custom waste management and tracking projects for their specific industries and or market sector. These industries and market sectors include, schools, oil, mining, waste water, military, chemical, retail, food, government and any other sector requiring the need to create custom material and waste disposition lists.

The system allows contractors to visually see the uploaded scanned recycling tickets and other recycling data via the system. This allows contractors and user to verify that the recycling ticket matches the data entered and provide proof of recycling.

The system detects if a recycling ticket has been previously used or entered into the system by another contractor or user and prevents this ticket from being reentered into the system. This function prevents fraudulent reuse of recycling tickets and faulty recycling reporting. This data can be viewed on-line or via mobile device.

The system provides allows contractors and users to "split" tickets so they can be applied to multiple projects. The system calculates the total ticket weight entered and the percentage of the ticket the user wants to apply to a particular project and then based on the data entered, retains a running balance of the weight and or percentage of the ticket that can be applied to other projects. Once the entire weight balance of the ticket is used by one or multiple users that ticket is then rendered unusable by any other user and can no longer be entered. This prevents fraudulent use of recycling tickets for reporting.

For recycling facilities: The system provides an on-line paperless third-party facility diversion mechanism, that allows for the recycling certification of recycling and material processing facilities.

The system allows recycling and salvage facilities to upload recycling tickets and data to specific waste management plans using a unique project tracking number. The system allows for any facility anywhere, no matter what facility management software the facility uses, to upload data via the internet and or mobile devices to a specific project.

The system provides allows recycling facilities to create and manage waste manage plans for their clients. Because of the configuration of this data it can be merged or combined with or into other waste management plans from other facilities and or users to create one waste management plan.

For property trackers: The system provides a paperless on-line mechanism to allow for property owners to track the construction recycling activities of contractors performing work within their specific property or portfolio of properties and view the recycling activity including statistics and performance in real time. The system allows the property owner or manager to do this by allowing the property owner to create and issue unique property identification (ID) codes and issue them to the contractors performing work on their property. The contractor will then enter this unique ID into the system the contractor's project will then be tracked during the course of construction and display the recycling data in real time to the owner by unit, by building, by property type, by region, by location and the portfolio as a whole. This mechanism also allows the property owner or manager to quickly see whether or not the contractor is meeting the recycling criteria set forth by the governing body and or the recycling criteria set forth by the property owner themselves. The system displays the statistical data for recycling for each property and contractor and displays the recycling, salvage and disposal total for each project performed within a building and for each project performed by the contractor. The system also displays the statistical data for all materials recycled, salvaged and disposed a long with what facility types, project types, hauling method, and construction types.

A further understanding of the on-line system of the present invention by a viewing of some screenshots or screen captures of the Green Halo System's Web pages provided in an appendix of this application.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of managing and coordinating the operations for waste diversion projects comprising:
providing access to a system controlling access to a plurality of components of the system according to a plurality of user classifications, wherein the plurality of user classifications comprises:
a first user classification, corresponding to a government user classification,
a second user classification, corresponding to a recycler user classification, and
a third user classification, corresponding to a contractor user classification;
for a first system component, accessible by users of the government user classification:
compiling information from users of the government user classification for a requirements database comprising a plurality of government jurisdictions, wherein each government jurisdiction specifies a geographic area for the government jurisdiction provided by users of the government user classification;
for each government jurisdiction, providing a first graphical user interface element allowing users of the government user classification to specify waste diversion requirements for the government jurisdiction; and
storing in the requirements database the specified waste diversion requirements for each government jurisdiction;
for a second system component, accessible by users of the recycler user classification:
compiling a recyclers database comprising a plurality of recycling facilities, wherein each recycling facility includes a geographic location for the recycling facility provided by users of the recycler user classification;
for each recycling facility of the plurality of recycling facilities, providing a second graphical user interface element allowing users of the recycler user classification to specify at least one waste material accepted at the recycling facility; and
storing in the recyclers database each recycling facility the specified at least one waste material accepted at the recycling facility;
receiving information for a particular jurisdiction through a third graphical user interface element of a Web site;
registering, by one or more computers operating the Web site, one or more waste diversion project requirements for the particular jurisdiction specified by a first government user;
storing in the requirements database the waste diversion project requirements for the particular jurisdiction;
receiving information through a fourth graphical user interface element of the Web site for a waste diversion project;
registering, by one or more computers operating the Web site, the waste diversion project for the particular jurisdiction and for a first contractor user of the Web site with the received information;
determining the waste diversion project corresponds to the particular jurisdiction with the waste diversion project requirements stored in the requirements database;
presenting, by the one or more computers, waste diversion project requirements for the particular jurisdiction to the first contractor user;
recording, by the one or more computers, an acceptance of the particular jurisdiction requirements by the first contractor user;
assigning, by the one or more computers, a unique project-identification number to the waste diversion project;
presenting, by the one or more computers, a list of waste processing facilities to the first contractor user based on a site location of the waste diversion project and a first waste material and a second waste material to be disposed of, wherein the first and second waste materials are different, and presenting the list of waste processing facilities comprises:
for each waste processing facility, displaying a carbon emissions value for hauling the waste material to be disposed of to that waste processing facility using an input supplied by the first contractor user comprising at least a size of a waste load; and
displaying on a screen to the first contractor user a first waste processing facility in the list, wherein the first waste processing facility is nearest to the site location of the waste diversion project compared to other waste processing facilities in the list;
providing a fifth graphical user interface element allowing the first contractor user to select the first waste processing facility for the waste diversion project;
after the first contractor has selected the first waste processing facility, performing an automated check to determine whether the first waste processing facility accepts the first waste material only, second waste material only, or both the first and second waste materials;
as a result of the automated check, when the first waste processing facility accepts the first waste material only, displaying an on-screen message to the first contractor user to select a salvage option for the second material, and preventing the first contractor user from submitting the waste diversion project to the first government user until after a salvage option for the second material has been selected, wherein the preventing the first contractor user from uploading waste diversion project to the first government user avoids a rejection by the first government user;
as a result of the automated check, when the first waste processing facility accepts the second waste material only, displaying an on-screen message to the first contractor user to select a salvage option for the first material, and preventing the first contractor user from uploading the waste diversion project to the first government user until after a salvage option for the first material has been selected, wherein the preventing the first contractor user from uploading the waste diversion project to the first government user avoids a rejection by the first government user;
as a result of the automated check, when the first waste processing facility accepts the first and second waste materials, not preventing the first contractor user from submitting the waste diversion project to the first government user;

only after the automated check has determined the first waste processing facility accepts both the first and second waste materials, providing a sixth graphical user interface element allowing the first contractor user to submit a plan for the waste diversion project to the first government user of the Web site and receiving an approval for the plan for the waste diversion project from the first government user;

tracking, by the one or more computers, a plurality of waste diversion process streams of the waste material from the site location of the waste diversion project to the first waste processing facility; and based on the tracking, generating a report on the waste diversion process streams, wherein the report is viewable by the first contractor user.

2. The method of claim 1 wherein the identifying on a screen to the first contractor user a first waste processing facility in the list comprises:

sorting, by the one or more computers, the list of waste processing facilities based on the computed carbon emissions value; and placing the first waste processing facility at a top of the list of waste processing facilities.

3. The method of claim 1 comprising:

presenting in the list of waste processing facilities a second waste processing facility, wherein a second carbon emissions value of the second waste processing facility is greater than the lowest carbon emissions value of the first waste processing facility; and when the first contractor user attempts to select the second waste processing facility for the waste diversion project, displaying a message on a screen to the first contractor user indicating the second waste processing facility does not have the lowest carbon emissions value.

4. The method of claim 3 comprising:

asking for a confirmation before allowing the first contractor user to select the second waste processing facility for the waste diversion project.

5. The method of claim 1 comprising:

generating, by the one or more computers, a report presenting a total of carbon emissions incurred by the waste diversion project.

6. The method of claim 1 wherein the tracking of the waste diversion process streams further comprises:

generating a printed receipt for a load of the waste material at the first waste processing facility, wherein the printed receipt includes information related to how the waste material in the load of waste material is to be diverted;

assigning a unique receipt number for the load of waste material, wherein the printed receipt comprises the unique receipt number;

receiving, through a terminal device, at least the receipt number from the printed receipt;

associating the unique project-identifying number with the unique receipt number in a database; and automatically updating one or more waste diversion statistics related to the information on the uniquely identified receipt in a database.

7. The method of claim 6 wherein the load of waste material is composed of material selected from a list comprising: metals, wood, plastics, hazardous waste, fixtures, specialty materials, rock, dirt, plant material, and glass.

8. The method of claim 6 wherein the waste diversion statistics are selected from the list comprising: percentage of material in the load of waste material that is associated with a given waste diversion project, percent of waste material that is recycled, percent of waste material that is salvaged, percent of waste material that is converted to fuel, percent of waste material that is converted to energy, percent of waste material that is converted into raw materials, percent of waste material that is donated to charity, and percent of waste material that is thrown away.

9. The method of claim 6 wherein the terminal is a mobile device, and for the mobile device, allowing the user to connect with a navigation system of the mobile device, and the navigation system will navigate the user to a selected waste processing facility.

10. The method of claim 1 based on the selection of the first waste processing facility, calculating an estimated diversion rate for the waste diversion project of the first contractor user;

comparing the estimated diversion rate to a required diversion rate for the first government user, and based on a result of this comparison, classifying the waste diversion project as being in a first category, second category, or third category, wherein the first category occurs when the estimated diversion rate greatly exceeds the required diversion rate, the second category occurs when the estimated diversion rate barely exceeds the required diversion rate, and the third category occurs when the estimated diversion rate is below the required diversion rate, when the estimated diversion rate is in the first category, not preventing the first contractor user from submitting the waste diversion project to the first government user;

when the estimated diversion rate is in the second category, not preventing the first contractor user from submitting the waste diversion project to the first government user, and also showing to the first contractor user one or more suggestions for improving a diversion rate of the waste diversion project; and when the estimated diversion rate is in the third category, preventing the first contractor user from submitting the waste diversion project to the first government user for approval.

11. The method of claim 1 wherein the waste diversion project is selected from a list comprising: a new construction project, a remodeling project, a recycling program, a deconstruction project, a salvage operation, and a clean-up operation.

12. The method of claim 1 wherein the first contractor user is selected from a list comprising: a general contractor, a subcontractor, a homeowner, a business, an educational facility, a recycler, a military facility, a public watchdog agency, a charity, and a government facility.

13. The method of claim 1 wherein the report on the waste diversion process streams is viewable by the first government user, and a first report type of the report comprises an automatically generated pie chart with colored pie slices representing salvaged materials, disposed of materials, and recycled materials, a second report type of the report comprises an automatically generated pie chart with colored pie slices representing a first material recycled, a second material recycled, and a third material recycled, and a third report type of the report comprises an automatically generated pie chart with colored pie slices representing a first number of occurrences of a self haul, second number of occurrences of a hauling service, and third number of occurrences of a debris box service.

14. The method of claim 1 wherein the first government user has jurisdiction over the waste diversion project.

15. The method of claim 1 further comprising:
assigning, by the one or more computers, a tracking number to the waste diversion project after receiving an approval for the plan for the waste diversion project from the first government user.

16. The method of claim 1 further comprising:
allowing the first contractor user to submit the waste diversion project to the first government user.

17. The method of claim 1 wherein a user of the second user classification can view information about the first contractor user, and the information about the first contractor user comprises a type of the first contractor user's waste diversion projects.

18. The method of claim 1 wherein the waste diversion project requirements for the first contractor user can be changed by the first government user.

19. A system for managing and coordinating the operations for waste diversion projects comprising:
a server comprising at least one processor and a memory device, wherein the memory device stores a computer program, and the at least one processor is configured by the computer program to:
provide controlling access to a plurality of components of the system according to a plurality of user classifications, wherein the plurality of user classifications comprises:
a first user classification, corresponding to a government user classification,
a second user classification, corresponding to a recycler user classification, and
a third user classification, corresponding to a contractor user classification;
for a first system component, accessible by users of the government user classification:
compile information from users of the government user classification a requirements database comprising a plurality of government jurisdictions, wherein each government jurisdiction specifies a geographic area for the government jurisdiction provided by users of the government user classification;
for each government jurisdiction, provide a first graphical user interface element that allows users of the government user classification to specify waste diversion requirements for the government jurisdiction; and
store in the requirements database the specified waste diversion requirements for each government jurisdiction;
for a second system component, accessible by users of the recycler user classification:
compile a recyclers database comprising a plurality of recycling facilities, wherein each recycling facility includes a geographic location for the recycling facility provided by users of the recycler user classification;
for each recycling facility of the plurality of recycling facilities, provide a second graphical user interface element that allows users of the recycler user classification to specify at least one waste material accepted at the recycling facility; and
store in the recyclers database each recycling facility the specified at least one waste material accepted at the recycling facility;
receive information through a third graphical user interface element of a Web site for a waste diversion project;
register operating the Web site through the processor, the waste diversion project for a particular jurisdiction and for a first contractor user of the Web site with the received information;
present waste diversion project requirements for the particular jurisdiction to the first contractor user;
record an acceptance of the particular jurisdiction requirements by the first contractor user;
assign a unique project-identification number to the waste diversion project;
present a list of waste processing facilities to the first contractor user based on a site location of the waste diversion project and a first waste material and a second waste material to be disposed of, wherein the first waste material is different from the second waste material, and presenting the list of waste processing facilities comprises:
for each waste processing facility, display a carbon emissions value for hauling the waste material to be disposed of to that waste processing facility using an input supplied by the first contractor user comprising at least a size of a waste load; and
display on a screen to the first contractor user a first waste processing facility in the list, wherein the first waste processing facility is nearest to the site location of the waste diversion project compared to other waste processing facilities in the list;
provide a fourth graphical user interface element that allows the first contractor user to select the first waste processing facility for the waste diversion project;
after the first contractor has selected the first waste processing facility, performing an automated check to determine whether the first waste processing facility accepts the first waste material only, second waste material only, or both the first and second waste materials;
as a result of the automated check, when the first waste processing facility accepts the first waste material only, displaying an on-screen message to the first contractor user to select a salvage option for the second material, and preventing the first contractor user from submitting the waste diversion project to the first government user until after a salvage option for the second material has been selected, wherein the preventing the first contractor user from uploading waste diversion project to the first government user avoids a rejection by the first government user;
as a result of the automated check, when the first waste processing facility accepts the second waste material only, displaying an on-screen message to the first contractor user to select a salvage option for the first material, and preventing the first contractor user from uploading the waste diversion project to the first government user until after a salvage option for the first material has been selected, wherein the preventing the first contractor user from uploading the waste diversion project to the first government user avoids a rejection by the first government user;
as a result of the automated check, when the first waste processing facility accepts the first and second waste materials, not preventing the first contractor user from submitting the waste diversion project to the first government user;
provide a fifth graphical user interface element that allows the first contractor user to submit a plan for the waste diversion project to a first government user of the Web site and receiving an approval for the plan for the waste diversion project from the first government user;

track a plurality of waste diversion process streams of the waste material from the site location of the waste diversion project to the first waste processing facility; and based on the tracking, generate a report on the waste diversion process streams, wherein the report is viewable by the first contractor user.

20. A method of managing and coordinating the operations for waste diversion projects comprising:

sending information through a first graphical user interface element of a Web site for a waste diversion project;

registering, by one or more computers operating the Web site, the waste diversion project for a particular jurisdiction and for a first contractor user of the Web site with the sent information;

presenting, by the one or more computers, waste diversion project requirements for the particular jurisdiction to the first contractor user;

recording, by the one or more computers, an acceptance of the particular jurisdiction requirements by the first contractor user;

assigning, by the one or more computers, a unique project-identification number to the waste diversion project;

presenting, by the one or more computers, a list of waste processing facilities to the first contractor user based on a site location of the waste diversion project and a first waste material and a second waste material to be disposed of, wherein the first waste material is different from second waste material, and presenting the list of waste processing facilities comprises:

for each waste processing facility, displaying a carbon emissions value for hauling the waste material to be disposed of to that waste processing facility using an input supplied by the first contractor user comprising at least a size of a waste load; and identifying on a screen to the first contractor user a first waste processing facility in the list, wherein the first waste processing facility is nearest to the site location of the waste diversion project compared to other waste processing facilities in the list;

providing a second graphical user interface element allowing the first contractor user to select the first waste processing facility for the waste diversion project;

after the first contractor has selected the first waste processing facility, performing an automated check to determine whether the first waste processing facility accepts the first waste material only, second waste material only, or both the first and second waste materials;

as a result of the automated check, when the first waste processing facility accepts the first waste material only, displaying an on-screen message to the first contractor user to select a salvage option for the second material, and preventing the first contractor user from submitting the waste diversion project to the first government user until after a salvage option for the second material has been selected, wherein the preventing the first contractor user from uploading waste diversion project to the first government user avoids a rejection by the first government user;

as a result of the automated check, when the first waste processing facility accepts the second waste material only, displaying an on-screen message to the first contractor user to select a salvage option for the first material, and preventing the first contractor user from uploading the waste diversion project to the first government user until after a salvage option for the first material has been selected, wherein the preventing the first contractor user from uploading the waste diversion project to the first government user avoids a rejection by the first government user;

as a result of the automated check, when the first waste processing facility accepts the first and second waste materials, not preventing the first contractor user from submitting the waste diversion project to the first government user;

providing a third graphical user interface element allowing the first contractor user to submit a plan for the waste diversion project to a first government user of the Web site and receiving an approval for the plan for the waste diversion project from the first government user;

tracking, by the one or more computers, a plurality of waste diversion process streams of the waste material from the site location of the waste diversion project to the first waste processing facility; and based on the tracking, generating a report on the waste diversion process streams, wherein the report is viewable by the first contractor user.

21. The method of claim 1 further comprising:

registering, by one or more computers operating the Web site, the first recycling facility specified by a first recycler user and a first waste material type accepted at the first recycling facility for recycling;

storing in the recyclers database the first recycling facility and the first waste material accepted, wherein the presenting, by the one or more computers, the list of waste processing facilities to the first contractor further comprises:

determining the first recycling facility to handle a first waste material of the first waste material type, specified by the first contractor user, from the waste diversion project; and including the first recycling facility in the list of waste processing facilities.

22. The method of claim 21 further comprising:

registering, by one or more computers operating the Web site, a second recycling facility specified by a second recycler user and a second waste material type accepted at the second recycling facility for recycling;

storing in the recyclers database the second recycling facility and the second waste material accepted, wherein the presenting, by the one or more computers, the list of waste processing facilities to the first contractor further comprises displaying the second recycling facility in the list if the second recycling facility handles the first waste material.

23. The method of claim 1 further comprising:

after the allowing the first contractor user to select the first waste processing facility, providing an indication to the first government user the first contractor user has selected the first waste processing facility.

24. The method of claim 6 wherein the receiving, through a terminal device, at least the receipt number from the printed receipt comprises:

scanning the printed receipt and its receipt number;

after scanning the printed receipt, determining if the printed receipt matches a previously entered receipt in the system; and if the printed receipt matches a previously entered receipt, disallowing the receipt from being entered into the system again.

25. The method of claim 6 wherein generating a printed receipt for a load of the waste material at the first waste processing facility, wherein the printed receipt includes information related to how the waste material in the load of waste material is to be diverted comprises:
- before generating the printed receipt, calculating a weight of the load for which the printed receipt is requested to be generated;
- allowing the first contractor user to specify a first percentage of the weight of the load to be used for a first generated printed receipt, while a second percentage is not used, wherein the first printed receipt is only for the first percentage of the load; and
- generating a second printed receipt, separate from the first printed receipt, for the second percentage of the load.

26. The method of claim 1 wherein the system disallows a user of the first user classification from accessing the system using the second graphical user interface element of the second user classification and the third graphical user interface element of the third user classification,
- the system disallows a user of the second user classification from accessing the system using the first graphical user interface element of the first user classification and the third graphical user interface element of the third user classification, and
- the system disallows a user of the third user classification from accessing the system using the first graphical user interface element of the first user classification and the second graphical user interface element of the second user classification.

* * * * *